US012407082B2

(12) United States Patent
Jin et al.

(10) Patent No.: US 12,407,082 B2
(45) Date of Patent: Sep. 2, 2025

(54) ANTENNA AND COMMUNICATION SYSTEM

(71) Applicants: Beijing BOE Sensor Technology Co., Ltd., Beijing (CN); BOE Technology Group Co., Ltd., Beijing (CN)

(72) Inventors: Yunnan Jin, Beijing (CN); Zhe Chen, Beijing (CN); Chunnan Feng, Beijing (CN); Shuo Yang, Beijing (CN); Sihui Bao, Beijing (CN); Faliang Dai, Beijing (CN); Xiang Liu, Beijing (CN); Zheng Chen, Beijing (CN); Zhifeng Zhang, Beijing (CN); He Liu, Beijing (CN); Liang Guo, Beijing (CN); Haoyang Zhang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/015,843

(22) PCT Filed: Jan. 24, 2022

(86) PCT No.: PCT/CN2022/073392
§ 371 (c)(1),
(2) Date: Jan. 12, 2023

(87) PCT Pub. No.: WO2023/137740
PCT Pub. Date: Jul. 27, 2023

(65) Prior Publication Data
US 2024/0250403 A1 Jul. 25, 2024

(51) Int. Cl.
*H01Q 1/12* (2006.01)
*H01Q 1/38* (2006.01)
(Continued)

(52) U.S. Cl.
CPC ......... *H01Q 1/1271* (2013.01); *H01Q 9/0414* (2013.01)

(58) Field of Classification Search
CPC ............ H01Q 1/38; H01Q 1/243; H01Q 1/50; H01Q 21/065; H01Q 21/08; H01Q 1/36;
(Continued)

(56) References Cited

U.S. PATENT DOCUMENTS

2006/0202898 A1* 9/2006 Li ........................ H01Q 1/1271 343/713

FOREIGN PATENT DOCUMENTS

CN 111342222 A 6/2020
CN 111541006 A 8/2020
(Continued)

*Primary Examiner* — Wei (Victor) Y Chan
(74) *Attorney, Agent, or Firm* — Nath, Goldberg & Meyer; Joshua B. Goldberg

(57) ABSTRACT

An antenna includes a first substrate and a second substrate oppositely arranged; the first substrate includes: a first dielectric substrate having a first surface and a second surface oppositely arranged; a reference electrode layer on the first surface; at least one first radiation part on the second surface and having an orthographic projection on the first dielectric substrate at least partially overlapping that of the reference electrode layer; and at least one feeding structure on the second surface, electrically connected to the first radiation part, and having an orthographic projection on the first dielectric substrate at least partially overlapping that of the reference electrode layer; the second substrate includes: a second dielectric substrate opposite to the second surface; and at least one second radiation part on the second dielectric substrate, and each having an orthographic projection on the first surface within that of one first radiation part.

20 Claims, 13 Drawing Sheets

(51) Int. Cl.
*H01Q 1/50* (2006.01)
*H01Q 9/04* (2006.01)

(58) Field of Classification Search
CPC .......... H01Q 1/48; H01Q 21/24; H01Q 9/045; H01Q 9/0407; H01Q 3/36; H01Q 9/0414; H01Q 9/0421; H01Q 21/0075; H01Q 9/42; H01Q 1/523; H01Q 21/0006
See application file for complete search history.

(56) References Cited

FOREIGN PATENT DOCUMENTS

| | | | |
|---|---|---|---|
| CN | 111755813 | A | 10/2020 |
| CN | 112072293 | A | 12/2020 |
| CN | 112151944 | A | 12/2020 |
| CN | 213845498 | U | 7/2021 |
| WO | 2012079034 | A1 | 6/2012 |

* cited by examiner

ANTENNA AND COMMUNICATION SYSTEM

This is a National Phase Application filed under 35 U.S.C. 371 as a national stage of PCT/CN2022/073392, filed Jan. 24, 2022, the contents of which are hereby incorporated by reference in its entirety.

TECHNICAL FIELD

The present disclosure belongs to the field of communication technology, and particularly relates to an antenna and a communication system.

BACKGROUND

With a continuous development of mobile communication technology, additional functional attributes of a glass window are increasingly remarkable. A fusion application of an antenna and the glass window becomes one of the most representative applications. Since a traditional antenna cannot be transparent, when the traditional antenna is used together with a transparent glass window, firstly, aesthetic of a whole surface of the glass window is influenced; secondly, due to a characteristic of a strong attenuation of glass to electromagnetic waves, when the antenna is closely attached to the glass window, the antenna cannot effectively radiate electromagnetic energy, and finally a problem of low antenna gain is caused. Therefore, it will become a trend toward a 5G embellished antenna to propose an antenna design scheme that may not only ensure high gain performance of the antenna, but also ensure transparency of the antenna.

SUMMARY

The present disclosure is directed to at least one of the problems in the related art, and provides an antenna and a communication system.

In a first aspect, an embodiment of the present disclosure provides an antenna, including a first substrate and a second substrate which are opposite to each other, wherein the first substrate includes:

a first dielectric substrate, which has a first surface and a second surface which are opposite to each other;

a reference electrode layer, which is on the first surface;

at least one first radiation part, which is on the second surface, wherein an orthographic projection of the at least one first radiation part on the first dielectric substrate at least partially overlaps an orthographic projection of the reference electrode layer on the first dielectric substrate; and at least one feeding structure, which is on the second surface and electrically connected to the at least one first radiation part, wherein an orthographic projection of the at least one feeding structure on the first dielectric substrate at least partially overlaps with the orthographic projection of the reference electrode layer on the first dielectric substrate, and the second substrate includes:

a second dielectric substrate, which is opposite to the second surface; and at least one second radiation part, which is on the second dielectric substrate, wherein an orthographic projection of each of the at least one second radiation part on the first surface is within an orthographic projection of a corresponding one of the at least one first radiation part on the first surface.

The antenna further includes at least one connection component and at least one driving circuit board; each of the at least one feeding structure has one first feeding port and at least one second feeding port; each of the at least one second feeding port of the feeding structure is electrically connected to a corresponding one of the at least one first radiation part; and each of the at least one connection component is electrically connected to the first feeding port, and is bonded and connected to a corresponding one of the at least one driving circuit board.

The connection component includes a first reference electrode, a second reference electrode, and a signal electrode on the second surface; extending directions of the first reference electrode, the second reference electrode and the signal electrode are identical; the signal electrode is between the first reference electrode and the second reference electrode; and the signal electrode is electrically connected to the first feeding port.

The first reference electrode and the second reference electrode are electrically connected to the reference electrode layer through vias penetrating through the first dielectric substrate, respectively.

The at least one feeding structure includes a first feeding structure and a second feeding structure, each of which includes one first feeding port and at least one second feeding port:

each of the at least one second feeding port of the first feeding structure is connected to a corresponding one of the at least one first radiation part at a node which is a first node; each of the at least one second feeding port of the second feeding structure is connected to a corresponding one of the at least one first radiation part at a node which is a second node; and for each of the at least one first radiation part, there is an included angle between an extending direction of a connecting line, which is between the first node and a center of the first radiation part, and an extending direction of a connecting line, which is between the second node and the center of the first radiation part.

For each of the at least one first radiation part, an extending direction of a connecting line between the first node and the center of the first radiation part is perpendicular to an extending direction of a connecting line between the second node and the center of the first radiation part.

A contour of the first radiation part includes a polygon, and any internal angle of the polygon is greater than 90°.

The polygon includes a first side, a second side, a third side, a fourth side, a fifth side, a sixth side, a seventh side, and an eighth side, which are sequentially connected; an extending direction of the first side is the same as an extending direction of the fifth side, and is perpendicular to an extending direction of the third side; and one of the at least one second feeding port of the first feeding structure and one of the at least one second feeding port of the second feeding structure are connected to the second side and the fourth side, respectively.

The second radiation part includes a quadrangle, and the quadrangle includes a ninth side, a tenth side, an eleventh side and a twelfth side which are sequentially connected; an intersection node between the ninth side and the tenth side is a first vertex, an intersection node between the tenth side and the eleventh side is a second vertex, and an intersection node between the eleventh side and the twelfth side is a third vertex; and an intersection node between the twelfth side and the ninth side is a fourth vertex:

a distance from an orthographic projection of the first vertex on the first radiation part to the second side is a first distance; a distance from an orthographic projection of the second vertex on the first radiation part to the fourth side is a second distance; a distance from an orthographic projection of the third vertex on the first radiation part to the sixth side is a third distance; and a distance from an orthographic projection of the fourth vertex on the first radiation part to the eighth side is a fourth distance; and the first distance, the second distance, the third distance, and the fourth distance have an equal value.

The second radiation part includes a quadrangle, and the quadrangle includes a ninth side, a tenth side, an eleventh side and a twelfth side which are sequentially connected; an intersection node between the ninth side and the tenth side is a first vertex, an intersection node between the tenth side and the eleventh side is a second vertex, and an intersection node between the eleventh side and the twelfth side is a third vertex; an intersection node between the twelfth side and the ninth side is a fourth vertex:

an intersection point between extension lines of the first side and the third side is a first intersection point; an intersection point between extension lines of the third side and the fifth side is a second intersection point; an intersection point between extension lines of the fifth side and the seventh side is a third intersection point; and an intersection point between extension lines of the seventh side and the ninth side is a fourth intersection point;

a distance between orthographic projections of the first vertex and the first intersection point on the first dielectric substrate is a fifth distance; a distance between orthographic projections of the second vertex and the second intersection point on the first dielectric substrate is a sixth distance; a distance between orthographic projections of the third vertex and the third intersection point on the first dielectric substrate is a seventh distance; and a distance between orthographic projections of the fourth vertex and the fourth intersection point on the first dielectric substrate is an eighth distance; and the fifth distance, the sixth distance, the seventh distance, and the eighth distance have an equal value.

The second radiation part includes a quadrangle, and the quadrangle includes a ninth side, a tenth side, an eleventh side and a twelfth side which are sequentially connected; extending directions of the ninth side and the first side are parallel to each other; extending directions of the tenth side and the third side are parallel to each other; extending directions of the eleventh side and the fifth side are parallel to each other; and extending directions of the twelfth side and the seventh side are parallel to each other.

The at least one first radiation part includes $2^n$ first radiation parts, which are arranged at intervals along a length direction of the antenna; each of the first feeding structure and the second feeding structure includes n stages of first feeding lines;

where n=1, the first feeding line is connected to two first radiation parts;

where n≥2, one first feeding line at a $1^{st}$ stage is connected to two adjacent first radiation parts, and the first radiation parts connected to different first feeding lines at the $1^{st}$ stage are different; and one first feeding line at an $m^{th}$ stage is connected to two adjacent first feeding lines at an $(m-1)^{th}$ stage, and the first feeding lines at the $(m-1)^{th}$ stage, which are connected to different first feeding lines at the $m^{th}$ stage, are different; where 2≤m≤Sn, and both m and n are integers.

The at least one first radiation part includes a plurality of first radiation parts, centers of the plurality of first radiation parts are on a straight line, a line segment connecting the centers of the plurality of first radiation parts together is a first line segment, and taking an extension line of the first line segment as an axis of symmetry, the first feeding structure and the second feeding structure are symmetric to each other.

The first dielectric substrate includes a first base, a first adhesive laver, a first fixing plate, a second adhesive layer, and a second base, which are stacked together; a surface of the first base away from the first fixing plate serves as the first surface; and a surface of the second base away from the first fixing plate serves as the second surface.

The second dielectric substrate includes a third base, a third adhesive layer, and a second fixing plate, which are stacked together; and the second radiation part is on a side of the third base away from the second fixing plate.

The antenna is configured to be applied in a glass window including a first glass and a second glass opposite to each other, and arranged between the first glass and the second glass, and the second glass also serves as the second fixing plate.

The antenna further includes a first conductive layer including the first radiation part and the feeding structure.

The first conductive layer is of a planar structure and has a contour adapted to a contour of the first dielectric substrate; the first conductive layer further includes a first redundant electrode, and the first redundant electrode is disconnected from both the feeding structure and the first radiation part.

The antenna further includes a second conductive layer on the second dielectric substrate, orthographic projections of a contour of the second conductive layer and a contour of the first conductive layer on the first dielectric substrate completely overlap each other, the second conductive layer includes the second radiation part and a second redundant electrode, and the second radiation part and the second redundant electrode are disconnected from each other.

At least one of the first conductive layer, the second conductive layer, and the reference electrode layer includes a metal mesh structure.

The metal mesh structure has a line width in a range of 2 μm to 30 μm, a line spacing in a range of 50 μm to 250 μm, and a line thickness in a range of 1 μm to 10 μm.

The first radiation part satisfies at least one of the following conditions:

having a central aperture:

having a notch at a side concave towards the center;

each corner being a flat chamfer; and having a salient angle at each corner.

The antenna has an operating frequency in a range of 2500 MHz to 2700 MHZ.

In a second aspect, an embodiment of the present disclosure further provides a communication system, which includes any one antenna described above.

The antenna is fixed to a glass window.

The communication system further includes:

a transceiving unit configured to transmit or receive a signal;

a radio frequency transceiver, which is connected to the transceiving unit and configured to modulate the signal transmitted by the transceiving unit or demodulate a signal received by the antenna and then transmit the signal to the transceiving unit;

a signal amplifier, which is connected to the radio frequency transceiver and configured to improve a signal-to-noise ratio of the signal output by the radio frequency transceiver or the signal received by the antenna;

a power amplifier, which is connected to the radio frequency transceiver and configured to amplify a power of the signal output by the radio frequency transceiver or the signal received by the antenna; and a filtering unit, which is connected to the signal amplifier, the power amplifier and the antenna, and configured to filter the received signal and then transmit the filtered signal to the antenna or filter the signal received by the antenna.

DETAIL DESCRIPTION OF EMBODIMENTS

Figure 1:
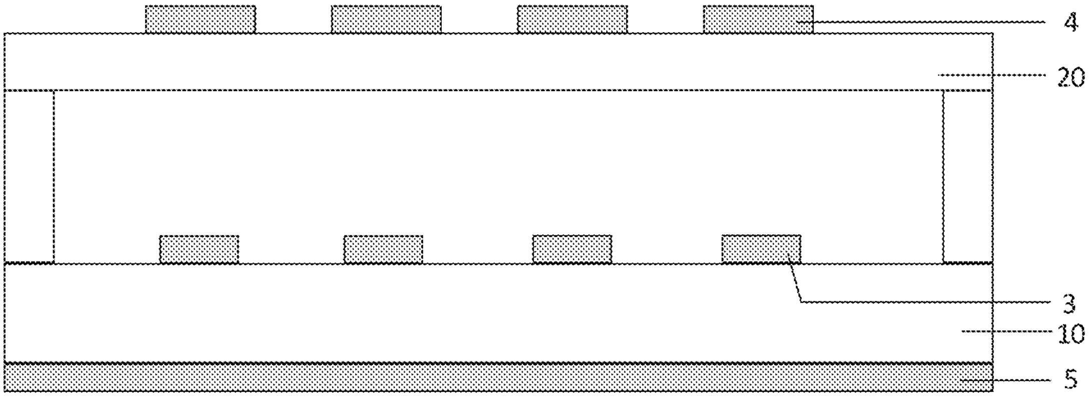
FIG. 1 illustrates a sectional view of an antenna.

In order enable one of ordinary skill in the art to better understand the technical solutions of the present disclosure, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The words "first", "second", and the like used in the present disclosure do not denote any order, quantity, or importance, but rather distinguish one element from another. Likewise, the word "a", "an", or "the" or the like does not denote a limitation of quantity, but rather denotes the presence of at least one. The word "comprising" or "comprises", or the like, means that an element or item preceding the word includes the element or item listed after the word and its equivalent, but does not exclude other elements or items. The word "connected" or "coupled" or the like is not restricted to physical or mechanical connections, but may include electrical connections, whether direct or indirect. "Upper", "lower", "left", "right", and the like are used only to indicate relative positional relationships, and when an absolute position of an object being described is changed, the relative positional relationships may also be changed accordingly.

The embodiments of the present disclosure are not limited to the embodiments shown in the drawings, but include modifications of configurations formed based on a manufacturing process. Thus, a region illustrated in the drawings has a schematic property, and a shape of the region shown in the drawings illustrates a specific shape of a region of an element, but is not intended to be limiting.

An embodiment of the present disclosure provides a transparent antenna that may be used in a glass window system for an automobile, a train (including a high-speed rail train), an aircraft, a building, or the like. The transparent antenna may be fixed on an inner side of the glass window (a side closer to the room). Since the transparent antenna has a higher optical transmittance, the transparent antenna has little influence on the transmittance of the glass window while realizing a communication function, and the transparent antenna will also become a trend toward an embellished antenna. The glass window according to an embodiment of the present disclosure includes, but is not limited to, a double-layer glass, and a type of the glass window may alternatively be a single-laver glass, a laminated glass, a thin glass, a thick glass, or the like. In an embodiment of the present disclosure, the glass window attached with the transparent antenna is applied to a subway window system, which is taken as an example for explanation. The transparent antenna has an operating frequency in a range of 2500 MHZ to 2700 MHZ.

FIG. 1 illustrates a sectional view of a transparent antenna. As shown in FIG. 1, the transparent antenna includes a first substrate and a second substrate disposed opposite to each other. The first substrate may include a first dielectric substrate 10, a reference electrode layer 5, and at least one first radiation part 3; the first dielectric substrate 10 includes a first surface (lower surface) and a second surface (upper surface) that are oppositely disposed; the reference electrode layer 5 is disposed on the first surface, and the at least one first radiation part 3 is disposed on the second surface. The second substrate includes a second dielectric substrate 20 and at least one second radiation part 4; the second dielectric substrate 20 includes a third surface (lower surface) and a fourth surface (upper surface) that are oppositely disposed; the at least one second radiation part 4 is disposed on the fourth surface, and an air gap may be filled between the second surface of the first dielectric substrate 10 and the third surface of the second dielectric substrate. The at least one second radiation part 4 may be disposed in a one-to-one correspondence with the at least one first radiation part 3, and an orthographic projection of the at least one second radiation part 4 on the first dielectric substrate 10 at least partially overlap an orthographic projection of the at least one first radiation part 3 corresponding to the at least one second radiation part 4 on the first dielectric substrate 10. Alternatively, the transparent antenna may further include a feeding structure (not shown in FIG. 1), which may be connected to the at least one first radiation part.

The transparent antenna shown in FIG. 1 may be a receiving antenna, a transmitting antenna, or a transceiving antenna capable of transmitting and receiving signals. When the transparent antenna transmits a signal, a first feeding port of each feeding structure receives a radio frequency signal, the feeding structure divides the radio frequency signal into a plurality of sub-signals, each sub-signal is output through a second feeding port to a first radiation part connected to the second feeding port, and the first radiation part 3 feeds the sub-signal to the second radiation part 4 corresponding to the first radiation part 3. When the transparent antenna receives a signal, after any one second radiation part 4 receives a radio frequency signal, the radio frequency signal is fed to the first radiation part 3 corresponding to the second radiation part, and then the first radiation part 3 transmits the radio frequency signal to the first feeding port through the second feeding port connected to the first radiation part 3.

The transparent antenna shown in FIG. 1 is provided with the at least one first radiation part 3 and the at least one second radiation part 4, and the at least one first radiation part 3 and the at least one second radiation part 4 are arranged opposite to each other, and a signal (for example, a radio frequency signal) is fed to the corresponding second radiation part 4 through the at least one first radiation part 3, so that compared with a case where only the at least one first radiation part or the at least one second radiation part is arranged, a radiation area of a radiation unit is increased by the at least one first radiation part 3 and the at least one second radiation part 4, which are opposite to each other, and a radiation efficiency is effectively improved. Based on the transparent antenna shown in FIG. 1, an embodiment of the present disclosure provides a transparent antenna with more optimized performance. The transparent antenna according to an embodiment of the present disclosure is specifically described below.

Figure 2:
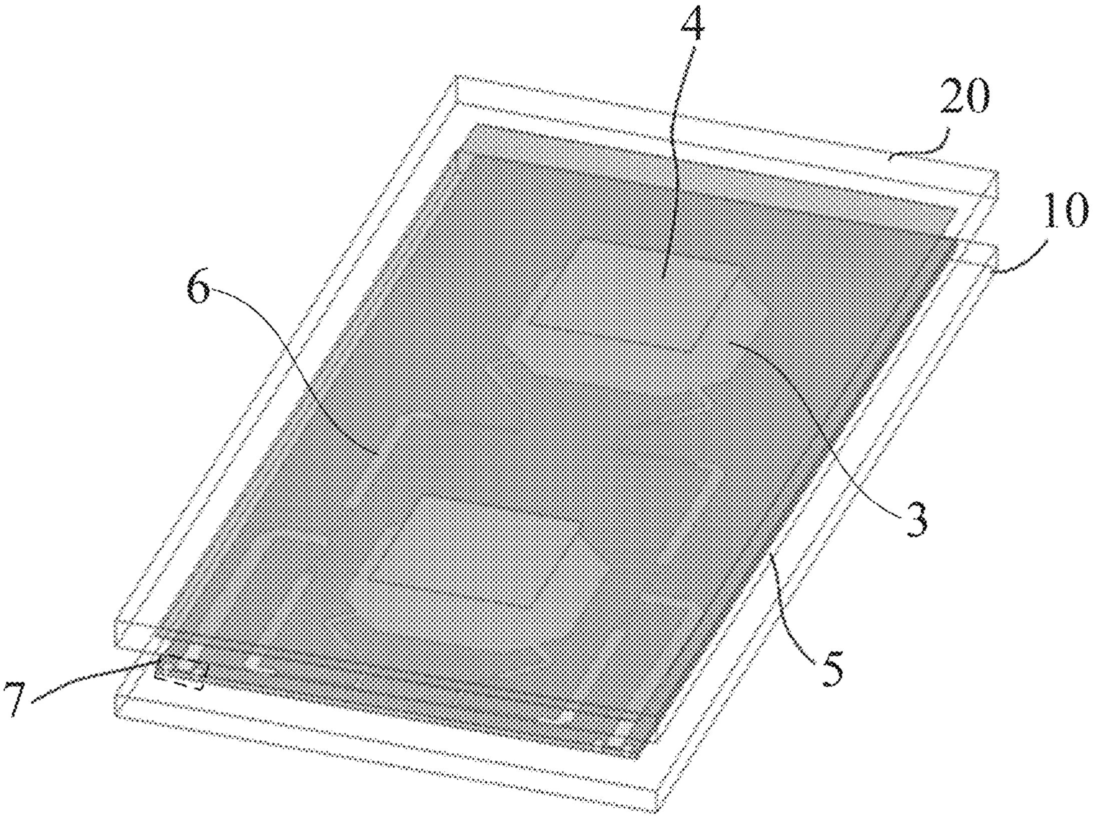
FIG. 2 is a perspective view of an antenna according to an embodiment of the present disclosure.
Figure 3:
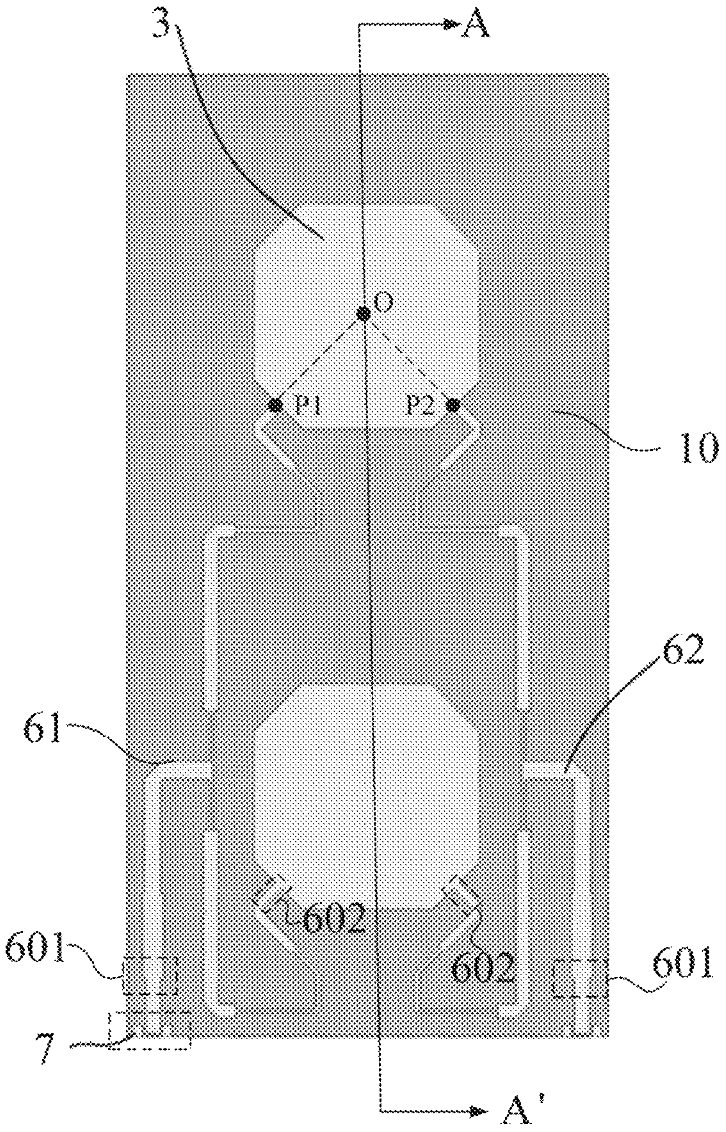
FIG. 3 is a top view of a first substrate of a transparent antenna according to an embodiment of the present disclosure.
Figure 4:
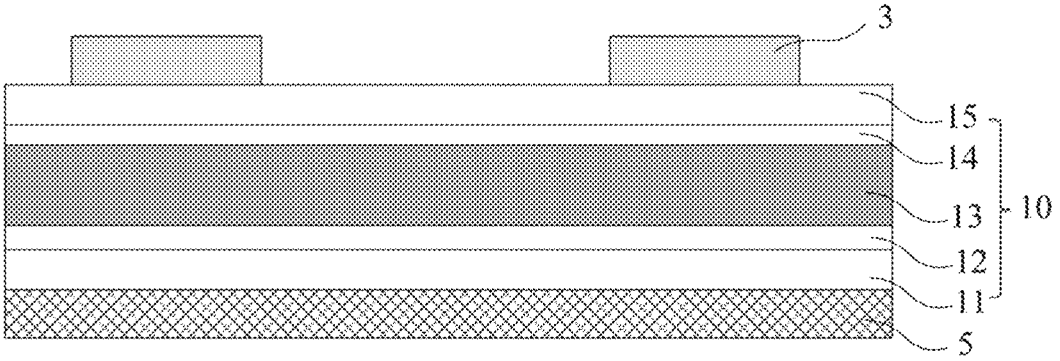
FIG. 4 is a sectional view taken along a line A-A' in FIG. 3.
Figure 5:
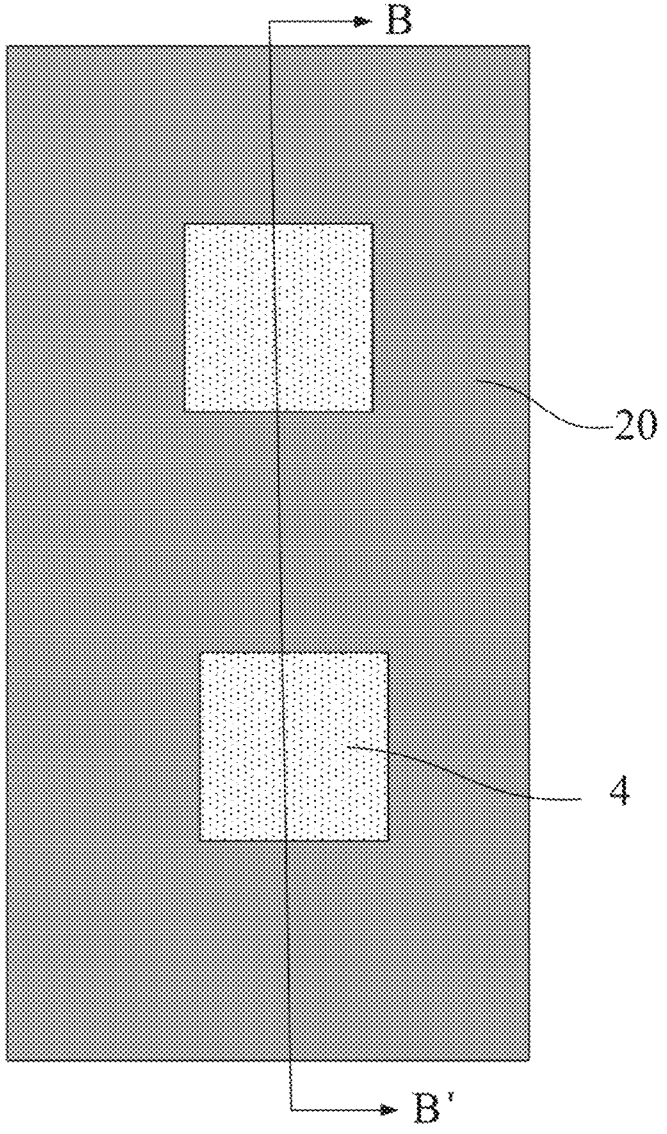
FIG. 5 is a top view of a second substrate of an antenna according to an embodiment of the present disclosure.
Figure 6:
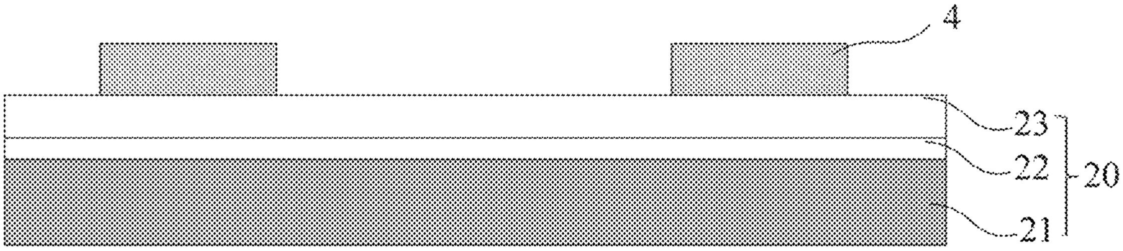
FIG. 6 is a sectional view taken along a line B-B' in FIG. 5.

FIG. 2 is a perspective view of a transparent antenna according to an embodiment of the present disclosure; FIG. 3 is a top view of a first substrate of a transparent antenna according to an embodiment of the present disclosure; FIG. 4 is a sectional view taken along a line A-A' in FIG. 3; FIG. 5 is a top view of a second substrate of the transparent antenna according to an embodiment of the present disclosure; FIG. 6 is a sectional view taken along a line B-B' in FIG. 5. In a first aspect, as shown in FIGS. 2 to 6, an embodiment of the present disclosure provides a transparent antenna including a first substrate and a second substrate disposed opposite to each other. The first substrate includes a first dielectric substrate 10, at least one first radiation part 3, at least one feeding structure 6, and a reference electrode layer 5. The second substrate includes a second dielectric substrate 20 and at least one second radiation part 4. The first dielectric substrate 10 includes a first surface and a second surface which are opposite to each other; and the second dielectric substrate 20 includes a third surface and a fourth surface which are opposite to each other. The second surface of the first dielectric substrate 10 and the third surface of the second dielectric substrate 20 are opposite to each other. The reference electrode layer 5 is disposed on the first surface of the first dielectric substrate 10, the first radiation part 3 and the feeding structure 6 are disposed on the second surface of the first dielectric substrate 10, and the feeding structure 6 is configured to feed a signal to the first radiation part 3. For example, the feeding structure 6 includes a first feeding port 601 and a second feeding port 602, the second feeding port 602 of the feeding structure 6 is connected to the first radiation part 3, and the first feeding port 601 is configured to receive and/or transmit radio frequency signals. The reference electrode layer 5 may be disposed on the third surface of the second dielectric substrate 20, or may be disposed on the fourth surface of the second dielectric substrate 20. The reference electrode layer 5 is disposed on the third surface of the second dielectric substrate 20 in the embodiment of the present disclosure. Meanwhile, an orthographic projection of each second radiation part 4 on the first dielectric substrate 10 is within an orthographic projection of one first radiation part 3 on the first dielectric substrate 10. For example, the at least one first radiation part 3 is arranged in a one-to-one correspondence with the at least one second radiation part 4, and an area of the first radiation part 3 is greater than an area of the second radiation part 4.

It should be noted that the transparent antenna according to an embodiment of the present disclosure may be a receiving antenna, a transmitting antenna, or a transceiving antenna capable of transmitting and receiving signals. In the embodiments of the present disclosure, a plurality of first radiation parts 3 and a plurality of second radiation parts 4, which are in a one-to-one correspondence with each other, are described as an example. FIG. 2 only illustrates two first radiation parts 3 and two second radiation parts 4. Alternatively, there may be one ore more than two of the first radiation parts 3 and the second radiation parts 4, which is not limited by the embodiment of the present disclosure. The reference electrode layer 5 includes, but is not limited to, a ground electrode layer. In an embodiment of the present disclosure, as an example, the reference electrode layer 5 is the ground electrode layer.

For example, when the transparent antenna transmits a signal, the first feeding port 601 of the feeding structure 6 receives a radio frequency signal, and divides the received radio frequency signal into two sub-signals, each of which is output to the first radiation part 3 through the corresponding second feeding port 602, then the first radiation part 3 feeds the received sub-signal to the second radiation part 4 corresponding to the first radiation part 3, and the radio frequency signal is radiated through the second radiation part 4. When the transparent antenna receives a signal, after any one second radiation part 4 receives a radio frequency signal, the radio frequency signal is fed to the first radiation part 3 corresponding to the second radiation part 4, and the second radiation part 4 transmits the radio frequency signal to the first feeding port 601 through the second feeding port 602 electrically connected to the second radiation part 4, thereby completing the receiving of the radio frequency signal.

In the transparent antenna according to an embodiment of the present disclosure, since the first radiation part 3 and the second radiation part 4 are disposed, the orthographic projection of the second radiation part 4 on the first dielectric substrate 10 is within the orthographic projection of the first radiation part 3 corresponding to the second radiation part 4 on the first dielectric substrate 10, and the first radiation part 3 and the second radiation part 4 cooperate to radiate a radio frequency signal, so that compared with an antenna provided with only the first radiation part 3, the radiation efficiency is effectively improved, the gain fluctuation in the frequency band is reduced, the gain matching with the loss is significantly improved, and the impedance in the frequency band is smoothed. Furthermore, the antenna according to an embodiment of the present disclosure is a transparent antenna, which is beneficial to embellishment of the antenna.

Figure 7:
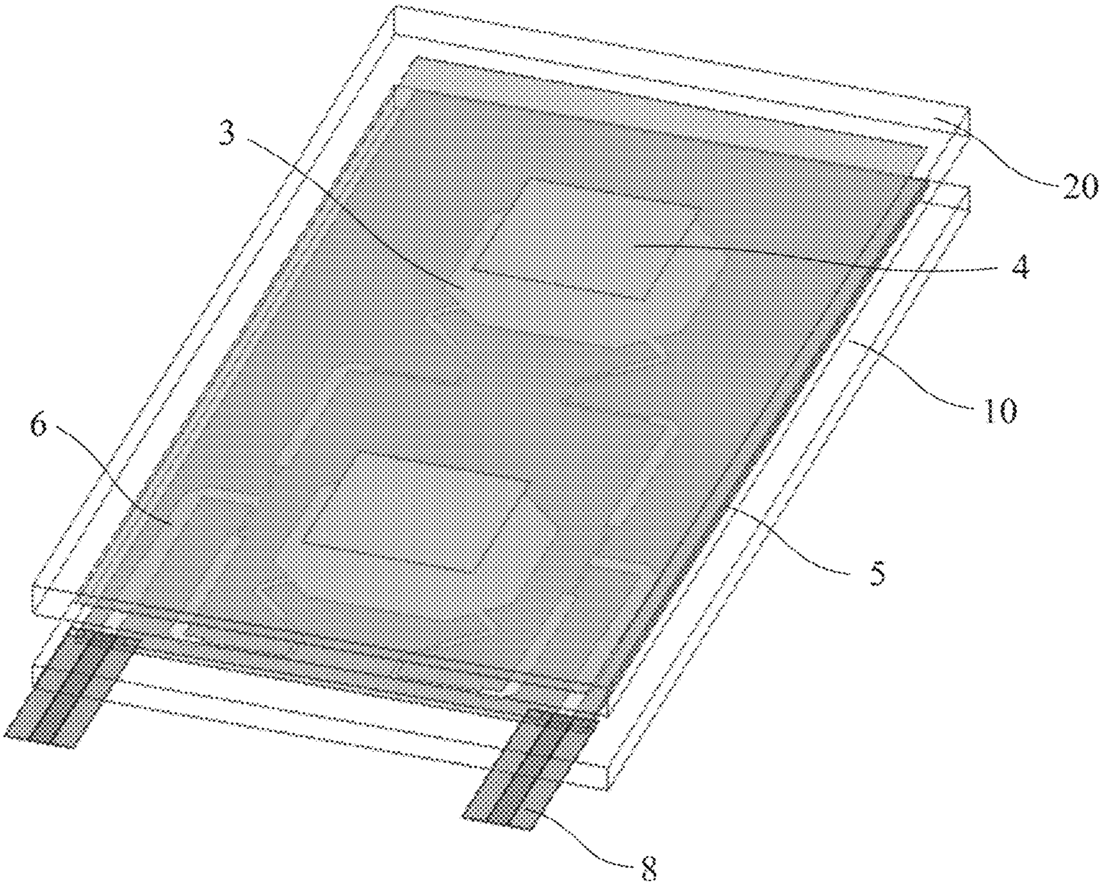
FIG. 7 is a perspective view of another antenna according to an embodiment of the present disclosure.
Figure 8:
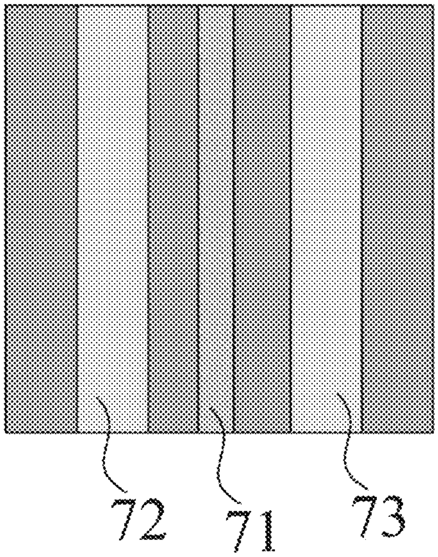
FIG. 8 is a top view of a connection component of an antenna according to an embodiment of the present disclosure.

FIG. 7 is a perspective view of another transparent antenna according to an embodiment of the present disclosure; FIG. 8 is a top view of a connection component 7 of a transparent antenna according to an embodiment of the present disclosure. In some examples, as shown in FIGS. 7 and 8, the transparent antenna in the embodiment of the present disclosure includes not only the above-described structure but also at least one connection component 7 and at least one driving circuit board 8. The feeding structure 6 includes a first feeding port 601 and at least one second feeding port 602. The at least one second feeding port 602 of the feeding structures 6 is connected to the at least one first radiation part 3 in a one-to-one correspondence, and the driving circuit board 8 is electrically connected to the first feeding port 601 of the feeding structure 6 through the connection component 7. For example, the driving circuit board 8, the feeding structure 6 and the connection component 7 are arranged in a one-to-one correspondence, that is, the numbers of the driving circuit board 8, the feeding structure 6 and the connection component 7 are equal to each other.

Further, as shown in FIG. 8, the connection component 7 may adopt a coplanar waveguide transmission line. That is, the connection component 7 may include a first reference electrode 72, a second reference electrode 73, and a signal electrode 71. The first reference electrode 72, the second reference electrode 73 and the signal electrode 71 extend in a same direction, and the signal electrode 71 is located between the first reference electrode 72 and the second reference electrode 73. The signal electrode 71 is electrically connected to the first feeding port 601 of the feeding structure 6. In the embodiment of the present disclosure, the driving circuit board 8 and the feeding structure 6 are electrically connected together through the coplanar waveguide transmission line, and the coplanar waveguide transmission line includes the first reference electrode 72 and the second reference electrode 73, so that interference between radio frequency signals transmitted in the signal electrode 71 can be effectively avoided. In some examples, the driving circuit board 8 is a flexible circuit board, and the first reference electrode 72, the second reference electrode 73 and the signal electrode 71 of the connection component 7 are all disposed on the second surface of the first dielectric substrate 10, and in this case, the flexible circuit board may be bonded and connected to the first reference electrode 72, the second reference electrode 73 and the signal electrode 71 through an optical clear conductive adhesive (ACF). It should be noted that the flexible circuit board is provided with connection pads corresponding to the first reference electrode 72, the second reference electrode 73 and the signal electrode 71, respectively, and the first reference electrode 72, the second reference electrode 73 and the signal electrode 71 are bonded and connected to the corresponding connection pads through the ACF. In some examples, orthographic projections of the first reference electrode 72, the second reference electrode 73 and the signal electrode 71 on the first dielectric substrate 10 overlap an orthographic projection of the reference electrode layer 5 on the first dielectric substrate 10, i.e., forming a conductor backed coplanar waveguide. In this case, the first reference electrode 72 and the second reference electrode 73 may be electrically connected to the reference electrode layer 5 through a via penetrating through the first dielectric substrate 10, so that the signal lines may be reduced.

Further, where the connection component 7 adopts a coplanar waveguide transmission line, the signal electrode 71 in the connection component 7 and the first feeding port 601 of the feeding structure 6 electrically connected to the signal electrode 71 may be a one-piece structure. Thus, the patterning is facilitated, and the lightness and thinness of the transparent antenna may be easily realized.

In addition, it is only taken as an example in the above description that the connect ion component 7 is a coplanar waveguide transmission line, and in an actual product, the connection component 7 may alternatively be any connection structure such as a connection pad, a microstrip line, a strip line, or the like.

In some examples, the number of the feeding structure 6 of the transparent antenna according to an embodiment of the present disclosure is two, and for convenience of description, two feeding units are represented by the first feeding structure 61 and the second feeding structure 62, respectively. The first feeding structure 61 and the second feeding structure 62 each include one first feeding port 601 and at least one second feeding port 602. Each second feeding port 602 of the first feeding structure 61 is connected to one first radiation part 3, and the intersection node between the two is the first node P1. Each second feeding port 602 of the second feeding structure 62 is connected to one first radiation part 3, and the intersection node between the two is the second node P2. For each first radiation part 3, there is an included angle between an extending direction of a connecting line, which is between the first node P1 and a center O of the first radiation part 3, and an extending direction of a connecting line, which is between the second node P2 and the center O of the first radiation part 3. That is, the first feeding structure 61 and the second feeding structure 62 have different feeding directions to the same first radiation part 3, thereby achieving a dual-polarized transparent antenna.

For example, for any one first radiation part 3, the extending direction of the connecting line between the first node P1 and the center of the first radiation part 3 is perpendicular to the extending direction of the connecting line between the second node P2 and the center of the first radiation part 3. In this case, if a polarization direction of a radio frequency signal fed by the first feeding structure 61 is 0°, then a polarization direction of a radio frequency signal fed by the second feeding structure 62 is 90°. If the polarization direction of the radio frequency signal fed by the first feeding structure 61 is +45°, then the polarization direction of the radio frequency signal fed by the second feeding structure 62 is −45°. It will be appreciated that the polarization directions of the first feeding structure 61 and the second feeding structure 62 may be changed through rotating the transparent antenna.

In some examples, a contour of the first radiation part 3 may be a polygon, a circle, an ellipse, or the like. In one example, the contour of the first radiation part 3 is a polygon, and any internal angle of the polygon is greater than 90°. For example, the polygon is an octagon, which includes a first side S1, a second side S2, a third side S3, a fourth side S4, a fifth side S5, a sixth side S6, a seventh side S7 and an eighth side S8 which are sequentially connected. An extending direction of the first side S1 is the same as an extending direction of the fifth side S5, and is perpendicular to an extending direction of the third side S3. One second feeding port 602 of the first feeding structure 61 and one second feeding port 602 of the second feeding structure 62 are connected to the second side S2 and the fourth side S4, respectively. For example, one second feeding port 602 of the first feeding structure 61 and one second feeding port 602 of the second feeding structure 62 are connected to the midpoint of the second side S2 and the midpoint of the fourth side S4, respectively. In this case, the polygon is equivalent to a square whose four right angles are cut off to form flat chamfers. The flat chamfers are formed to achieve impedance matching and reduce the loss.

Figure 9:
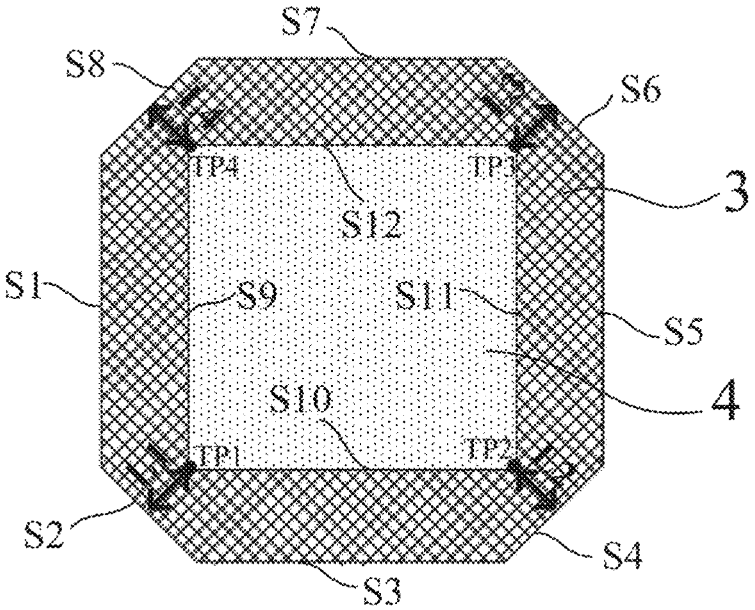
FIG. 9 is a schematic diagram illustrating a corresponding relationship between a first radiation part and a second radiation part of an antenna according to an embodiment of the present disclosure.

In one example, as shown in FIG. 9, the second side S2, the fourth side S4, the sixth side S6, and the eighth side S8 of the contour of the first radiation part 3 have a same length, the first side S1 and the fifth side S5 have a same length, and the third side S3 and the seventh side S7 have a same length. The lengths of the second side S2, the fourth side S4, the sixth side S6 and the eighth side S8 determine the size of the flat chamfer of the polygon. Alternatively, the lengths of the second side S2, the fourth side S4, the sixth side S6 and the eighth side S8 depend on the requirement on the impedance of the first radiation part 3.

Further, with continued reference to FIG. 9, where the contour of the first radiation part 3 is the octagon as described above, a contour of the second radiation part 4 may be a quadrangle. The quadrangle includes a ninth side S9, a tenth side S10, an eleventh side S11 and a twelfth side S12 which are sequentially connected. A intersection node between the ninth side S9 and the tenth side S10 is a first vertex TP1, an intersection node between the tenth side S10 and the eleventh side S11 is a second vertex TP2, an intersection node between the eleventh side S1 and the twelfth side S12 is a third vertex TP3, and an intersection node between the twelfth side S12 and the ninth side S9 is a fourth vertex TP4.

In one example, with continued reference to FIG. 9, for one first radiation part 3 and the second radiation part 4 corresponding to the first radiation part 3, a distance from an orthographic projection of the first vertex TP1 of the second radiation part 4 on the first radiation part 3 to the second side S2 is a first distance L1; a distance from an orthographic projection of the second vertex TP2 of the second radiation part 4 on the first radiation part 3 to the fourth side S4 is a second distance L2; a distance from an orthographic projection of the third vertex TP3 of the second radiation part 4 on the first radiation part 3 to the sixth side S6 is a third distance L3; and a distance from an orthographic projection of the fourth vertex TP4 of the second radiation part 4 on the first radiation part 3 to the eighth side S8 is a fourth distance L4. The first distance L1, the second distance L2, the third distances L3, and the fourth distance L4 have an equal value, i.e., L1=L2=L3=L4.

Figure 10:
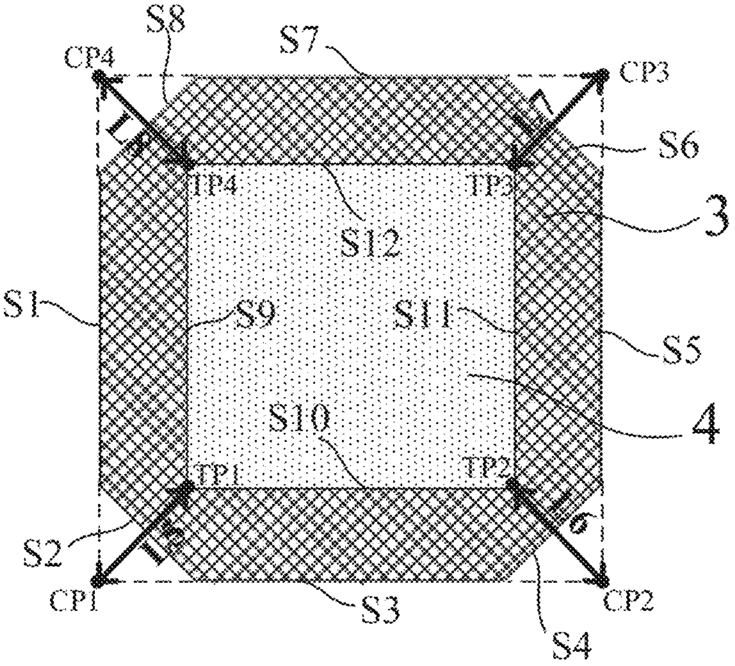
FIG. 10 is a schematic diagram illustrating another corresponding relationship between a first radiation part and a second radiation part of an antenna according to an embodiment of the present disclosure.

In another example, as shown in FIG. 10, for one first radiation part 3 and the second radiation part 4 corresponding to the first radiation part 3, an intersection point between extension lines of the first side S1 and the third side S3 of the first radiation part 3 is a first intersection point CP1; an intersection point between extension lines of the third side S3 and the fifth side S5 is a second intersection point CP2; an intersection point between extension lines of the fifth side S5 and the seventh side S7 is a third intersection point CP3; an intersection point between extension lines of the seventh side S7 and the ninth side S9 is a fourth intersection CP4. A distance between orthographic projections of the first vertex TP1 of the second radiation part 4 and the first intersection point CP1 on the first dielectric substrate 10 is a fifth distance L5; a distance between orthographic projections of the second vertex TP2 of the second radiation part 4 and the second intersection point CP2 on the first dielectric substrate 10 is a sixth distance L6; a distance between orthographic projections of the third vertex TP3 of the second radiation part 4 and the third intersection point CP3 on the first dielectric substrate 10 is a seventh distance L7; and a distance between orthographic projections of the fourth vertex TP4 of the second radiation part 4 and the fourth intersection point CP4 on the first dielectric substrate 10 is an eighth distance L8. The fifth distance L5, the sixth distance L6, the seventh distance L7 and the eighth distance L8 have an equal value, i.e., L5=L6=L7=L8.

In some examples, where the contour of the first radiation part 3 adopts the octagon as described above, the contour of the second radiation part 4 adopts the quadrangle as described above. For one first radiation part 3 and the second radiation part 4 corresponding to the first radiation part 3, an extending direction of the ninth side S9 of the contour of the second radiation part 4 is parallel to the extending direction of the first side S1 of the contour of the first radiation part 3; an extending direction of the tenth side S10 of the contour of the second radiation part 4 is parallel to the extending direction of the third side S3 of the contour of the first radiation part 3; an extending direction of the eleventh side S11 of the contour of the second radiation part 4 is parallel to the extending direction of the fifth side S5 of the contour of the first radiation part 3; and an extending direction of the twelfth side S12 of the contour of the second radiation part 4 is parallel to the extending direction of the seventh side S7 of the contour of the first radiation part 3.

Figure 11:
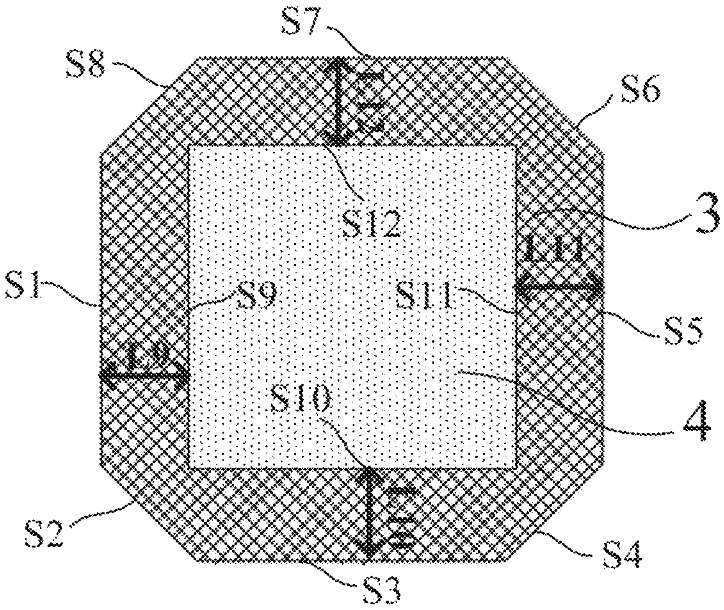
FIG. 11 is a schematic diagram illustrating another corresponding relationship between a first radiation part and a second radiation part of an antenna according to an embodiment of the present disclosure.

Further, as shown in FIG. 11, a distance between orthographic projections of the ninth side S9 of the contour of the second radiation part 4 and the first side S1 of the contour of the first radiation part 3 on the first dielectric substrate 10 is a ninth distance L9; a distance between orthographic projections of the tenth side S10 of the contour of the second radiation part 4 and the third side S3 of the contour of the first radiation part 3 on the first dielectric substrate 10 is a tenth distance L10; a distance between orthographic projections of the eleventh side S11 of the contour of the second radiation part 4 and the fifth side S5 of the contour of the first radiation part 3 on the first dielectric substrate 10 is an eleventh distance L11; and a distance between orthographic projections of the twelfth side S12 of the contour of the second radiation part 4 and the seventh side S7 of the contour of the first radiation part 3 on the first dielectric substrate 10 is a twelfth distance L12. The ninth distance L9, the tenth distance L10, the eleventh distance L11 and the twelfth distance L12 may have a same value, i.e., L9=L10=L11=L12.

It should be noted that the contours of the first radiation part 3 and the second radiation part 4 are not limited to the above figures. In some examples, the first radiation part 3 and the second radiation part 4 may each adopt a radiation patch having any shape such as a circle, a rectangle, a diamond, a hexagon, an octagon, or the like. Further, the first radiation part 3 and the second radiation part 4 satisfy at least one of the following conditions: having a central aperture; having a notch at the side concave towards the center; each corner being a flat chamfer; having a salient angle at each corner. The impedances of the first radiation part 3 and the second radiation part 4 are adjusted by such an arrangement. Meanwhile, through such an arrangement, the transmission path of the current can also be increased, thereby reducing the resonant frequency of the antenna.

In some examples, the feeding structure 6 in the embodiment of the present disclosure may be a power division feeding network, that is, the first feeding structure 61 and the second feeding structure 62 both are power division feeding networks. For example, where the number of the first radiation parts 3 is 2", the first radiation parts 3 are arranged side by side at intervals, where n≥1, and n is an integer. The first feeding structure 61 and the second feeding structure 62 each include n stages of first feeding lines.

Specifically, where n=1, the transparent antenna includes two first radiation parts 3, and the first feeding structure 61 and the second feeding structure 62 each include one stage of first feeding line. It this case, the first feeding structure 61 and the second feeding structure 62 are T-type (one-to-two) power dividers. The first feeding line of the first feeding structure 61 is electrically connected to two first radiation parts 3, the first feeding line of the second feeding structure 62 is also electrically connected to the two first radiation parts 3, and the first feeding line of the first feeding structure 61 and the first feeding line of the second feeding structure 62 connecting to a same first radiation part 3 are connected to this first radiation part 3 at different intersection nodes. An end of the first feeding line of the first feeding structure 61 connected to the first radiation part 3 serves as the second feeding port 602 of the first feeding structure 61, and an end of the first feeding line of the second feeding structure 62 connected to the first radiation part 3 serves as the second feeding port 602 of the first feeding structure 61.

Where n≥2, one first feeding line at the $1^{st}$ stage is connected to two adjacent first radiation parts 3, and the first radiation parts 3 connected to different first feeding lines at the $1^{st}$ stage are different. One first feeding line at the $m^{th}$ stage is connected to two adjacent first feeding lines at the $(m-1)^{th}$ stage, and the first feeding lines at the $(m-1)^{th}$ stage connected to different first feeding lines at the $m^{th}$ stage are different, where 2≤m≤n, and both m and n are integers.

It should be noted that in the first feeding structure 61, an end of the first feeding line at the $1^{st}$ stage connected to the first radiation part 3 serves as the second feeding port 602 of the first feeding structure 61, and an end of the first feeding line at the $n^{th}$ stage not connected to the first feeding line at the $(n-1)^{th}$ stage serves as the first feeding port 601 of the first feeding structure 61. In the second feeding structure 62, an end of the first feeding line at the $1^{st}$ stage connected to the first radiation part 3 serves as the second feeding port 602 of the second feeding structure 62, and an end of the first feeding line at the $n^{th}$ stage not connected to the first feeding line at the $(n-1)^{th}$ stage serves as the first feeding port 601 of the second feeding structure 62.

In one example, the number of the first radiation parts 3 is four, and each of the first feeding structure 61 and the second feeding structure 62 employs two stages of first feeding lines with a one-to-two and two-to-four division. In the first feeding structure 61, both ends of each of two first feeding lines at the $1^{st}$ stage are connected to two adjacent first radiation parts 3 (as the second feeding ports 602), respectively; both ends of the first feeding line at the $2^{nd}$ stage are connected to two first feeding lines at the $1^{st}$ stage (connected to midpoints of the two first feeding lines), respectively, and a port is provided at a midpoint of the first feeding line at the $2^{nd}$ stage and serves as the first feeding port 601. Similarly, in the second feeding structure 62, both ends of each of two first feeding lines at the $1^{st}$ stage are connected to two adjacent first radiation parts 3 (as the second feeding ports 602), respectively; both ends of the first feeding line at the $2^{nd}$ stage are connected to two first feeding lines at the $1^{st}$ stage (connected to midpoints of the first feeding lines), respectively, and a port is provided at a midpoint of the first feeding line at the $2^{nd}$ stage and serves as the first feeding port 601.

In some examples, where a plurality of first radiation parts 3 are provided, the centers O of the plurality of first radiation parts 3 are on a straight line, the centers O of the plurality of first radiation parts 3 are connected together to form a first line segment, and taking an extension line of the first line segment as an axis of symmetry, the first feeding structure 61 and the second feeding structure 62 are symmetric to each other. Through such an arrangement, the arrange of the elements in the transparent antenna may be facilitated, and the compactness of the transparent antenna may be improved.

In some examples, as shown in FIG. 4, no matter the transparent antenna in the embodiment of the present disclosure adopts any one of the above described structures, the first dielectric substrate 10 includes a first base 11, a first adhesive layer 12, a first fixing plate 13, a second adhesive layer 14, and a second base 15, which are stacked together. A surface of the first base 11 away from the first fixing plate 13 serves as a first surface of the first dielectric substrate 10, and a surface of the second base 15 away from the first fixing plate 13 serves as a second surface of the first dielectric substrate 10. That is, the reference electrode layer 5 is disposed on the surface of the first base 11 away from the first fixing plate 13, and the first radiation part 3 and the feeding structure 6 are disposed on the surface of the second base 15 away from the first fixing plate 13.

Further, the materials of the first base 11 and the second base 15 may be the same or different. For example, the first base 11 and the second base 15 are flexible films made of a material including, but not limited to. Polyethylene Terephthalate (PET), or Polyimide (PI), or the like. In an embodiment of the present disclosure, as an example, the first base 11 and the second base 15 are both made of PET. The first base 11 and the second base 15 each have a thickness of about 50 μm to about 250 μm. The first base 11 and the second base 15 are flexible and cannot provide good support for the first radiation part 3, the feeding structure 6 and the reference electrode layer 5, and each is prone to deformation, so that a desired radiation effect cannot be obtained. Thus, the first fixing plate 13 is employed to maintain a rigidity of the first substrate, and a material of the first fixing plate 13 includes, but is not limited to, Polycarbonate (PC), Copolymers of Cycloolefin (COP) or acrylic/Polymethyl Methacrylate (PMMA). A thickness of the first fixing plate 13 is in a range of about 1 mm to about 3 mm. The materials of the first adhesive layer and the second adhesive layer may be the same or different. For example, Optically Clear Adhesive (OCA) is adopted as the material of the first adhesive layer 12 and the second adhesive layer 14.

In some examples, as shown in FIG. 6, the second dielectric substrate 20 may include a third base 21, a third adhesive layer 22, and a second fixing plate, which are stacked together, and the second radiation part 4 may be disposed on a side of the third base 21 away from the second fixing plate.

In one example, the transparent antenna in the embodiments of the present disclosure may be applied to a glass window including a first glass (inner glass, at an indoor side) and a second glass (outer glass, at an outdoor side) that are oppositely disposed. The transparent antenna is arranged between the first glass and the second glass, and the second glass also serves as the second fixing plate. That is, when the transparent antenna is applied to a glass window, the second radiation part 4 may be formed on the third base 21, and attached to a side of the second glass close to the first glass through the third adhesive layer 22.

Further, a material of the third base 21 may be the same as a material of the first base 11 and the second base 15, and a material of the third adhesive layer 22 may be the same as a material of the first adhesive layer 12 and the second adhesive layer 14, so the description of the material of the third base 21 and the third adhesive layer 22 is not repeated here.

Figure 12:
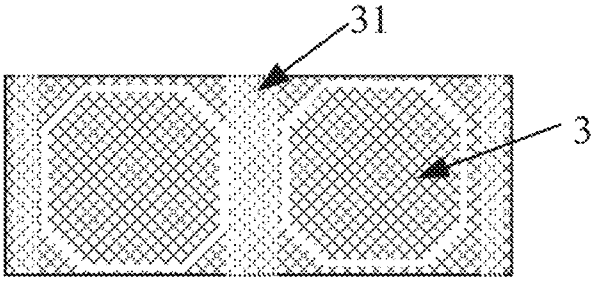
FIG. 12 is a schematic diagram of a part of a first conductive layer of an antenna according to an embodiment of the present disclosure.

In some examples, as shown in FIG. 12, the transparent antenna in the embodiment of the present disclosure includes a first conductive layer formed on the second surface of the first dielectric substrate 10, and the first conductive layer includes the patterns of the first radiation part 3 and the feeding structure 6. For example, where the first dielectric substrate 10 includes the first base 11, the first adhesive layer 12, the first fixing plate 13, the second adhesive layer 14, and the second base 15, which are stacked together, the first conductive layer may be formed on the second base 15 through an imprinting or etching process, and then fixed to the first fixing plate 13 through the second adhesive layer 14. Meanwhile, since the first conductive layer includes the first radiation part 3 and the feeding structure 6, that is, both the first radiation part 3 and the feeding structure 6 are disposed on a same layer and made of a same material, the preparation may be completed in one process.

Further, with continued reference to FIG. 12, a contour of the first conductive layer is adapted to a contour of the first dielectric substrate 10, and the first conductive layer may be a planar structure. The first conductive layer includes not only the first radiation part 3 and the feeding structure 6, but also a first redundant electrode 31, which is disconnected from both the feeding structure 6 and the first radiation part 3. Since the first electrode layer includes the first redundant electrode 31, vacant positions of the first conductive layer except for the feeding structure 6 and the first radiation part 3 are filled, thereby contributing to the improvement of the uniformity of the optical transmittance of the transparent antenna.

Figure 13:
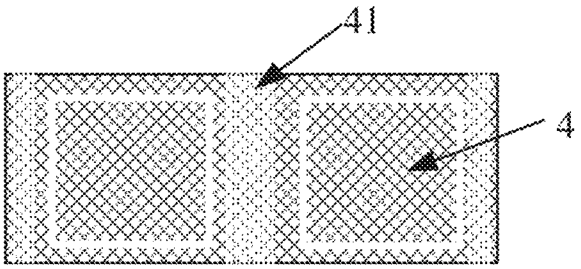
FIG. 13 is a schematic diagram of a part of a second conductive layer of an antenna according to an embodiment of the present disclosure.

In some examples, as shown in FIG. 13, the transparent antenna in the embodiment of the present disclosure includes a second conductive layer formed on the second dielectric substrate 20, and orthographic projections of a contour of the second conductive layer and a contour of the first conductive layer on the first dielectric substrate 10 completely overlap each other. The second conductive layer includes the second radiation part 4 and a second redundant electrode 41, which are disconnected from each other. Since the second electrode layer includes the second redundant electrode 41, vacant positions of the second conductive layer except for the second radiation part 4 are filled, thereby contributing to the improvement of the uniformity of the optical transmittance of the transparent antenna. In addition, where the second dielectric substrate 20 includes the third base 21, the third adhesive layer 22 and the second fixing plate, which are stacked together, the second conductive layer may be formed on the third base 21 through an imprinting or etching process, and then fixed to the second fixing plate through the third adhesive layer 22. When the transparent antenna in the embodiment of the present disclosure is disposed in the above-described glass window, the second conductive layer is formed on the third base 21, and then may be fixed on the second glass of the glass window through the third adhesive layer 22.

Further, in the embodiment of the present disclosure, the first conductive layer, the second conductive layer, and the reference electrode layer 5 may all adopt a metal mesh structure. Where the first conductive layer, the second conductive layer and the reference electrode layer 5 all adopt the metal mesh structure, hollow-out parts of the first conductive layer, the second conductive layer and the reference electrode layer may be arranged in a one-to-one correspondence, thereby the optical transmittance of the transparent antenna is improved.

It should be noted that, since the first conductive layer is of a planar structure and adopts a metal mesh structure, all the first radiation part 3, the feeding structure 6 and the first redundant electrode 31 are of a metal mesh structure, and the metal mesh structure is designed to be broken at the junction positions of the first radiation part 3, the feeding structure 6 and the first redundant electrode 31. In addition, in order to prevent the first redundant electrode 31 from interfering with the radio frequency signal, nodes in the metal mesh structure corresponding to the first redundant electrode 31 are disconnected from each other. For example, when preparing the metal mesh structure, the nodes in the metal mesh structure corresponding to the first redundant electrode 31 are disconnected from each other through a laser. Similarly, since the second conductive layer also is of a planar structure and adopts a metal mesh structure, the metal mesh is broken at the boundary position between the second radiation part 4 and the second redundant electrode 41. In order to prevent the second redundant electrode 41 interfering with the radio frequency signal, nodes in the metal mesh structure corresponding to the second redundant electrode 41 are disconnected from each other, and the disconnection manner may be the same as that of the first redundant electrode 31.

Figure 14:
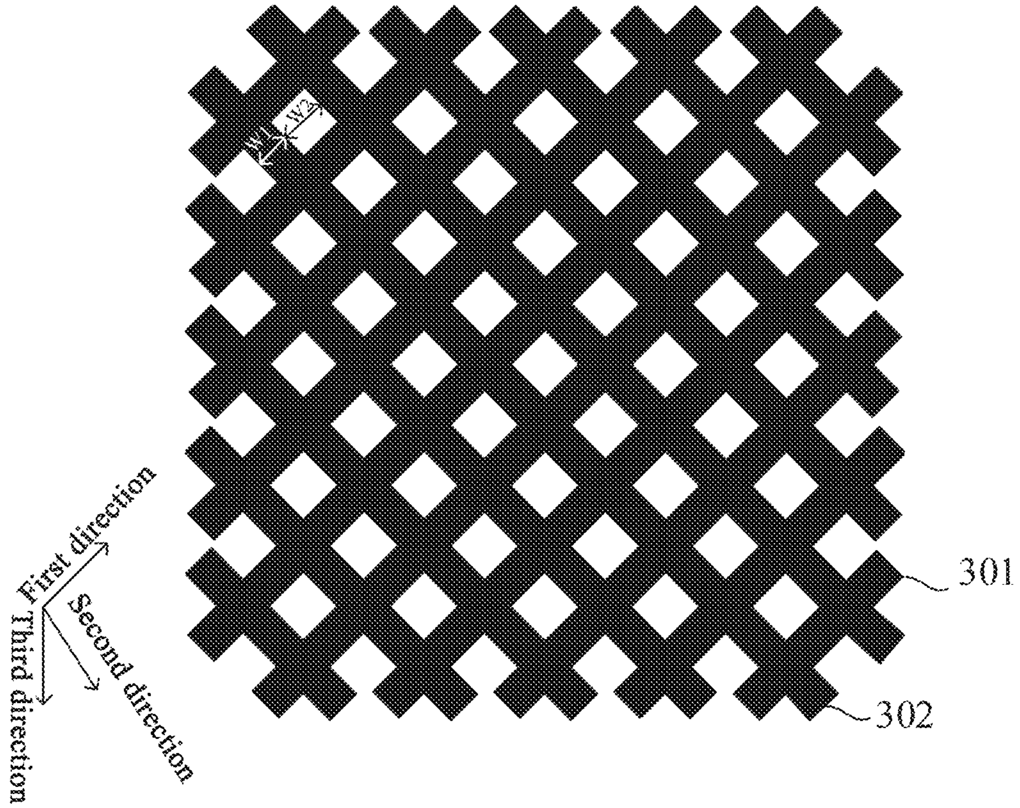
FIG. 14 is a schematic diagram of a metal mesh structure of an antenna according to an embodiment of the present disclosure.

In some examples, as shown in FIG. 14, the metal mesh structure employed in the embodiments of the present disclosure may include a plurality of first metal lines 301 and a plurality of second metal lines 302 intersecting with each other. The first metal lines 301 are arranged side by side along a first direction and extend along a second direction; the second metal lines 302 are disposed side by side along the first direction and extend along a third direction.

In some examples, ends of the first metal lines and the second metal lines of the first radiation part 3 are connected together, that is, a periphery of the first radiation part 3 is a closed-loop structure. In an actual product, the ends of the first metal lines and the second metal lines of the first radiation part 3 may not be connected to each other, that is, the periphery of the first radiation part 3 is radial. Similarly, the metal mesh structure of the reference electrode layer 5 and the second radiation part 4 may be disposed in a same manner as the first radiation part 3, and therefore, the description thereof is not repeated herein. In an embodiment of the present disclosure, an optical transmittance of each metal mesh structure is in a range of about 70% to about 88%.

The extending directions of each first metal line and each second metal line of the metal mesh structure may be perpendicular to each other, and in this case, square or rectangular hollow-out parts are formed. Alternatively, the extending directions of each first metal line and each second metal line of the metal mesh structure may be not perpendicular to each other. For example, an included angle between the extending directions of each first metal line and each second metal line is 45°, and in this case, diamond-shaped hollow-out parts are formed.

Further, a line width, a line thickness and a line spacing of the first metal lines of the metal mesh structure are preferably the same as those of the second metal lines of the metal mesh structure, respectively, and may alternatively be different from those of the second metal lines of the metal mesh structure. For example, the first metal lines and the second metal lines each has a line width W1 in a range of about 1 μm to about 30 μm, a line spacing W2 in a range of about 50 μm to 250 μm, and a line thickness in a range of about 0.5 μm to about 10 μm.

Further, the materials of the first conductive layer, the second conductive layer and the reference electrode layer 5 include, but are not limited to, a metal material such as copper, silver, aluminum, or the like, which are not limited in an embodiment of the present disclosure.

In order to make the structure and effect of the transparent antenna according to an embodiment of the present disclosure clearer, a specific structure of a transparent antenna is given below.

Referring to FIG. 7, the transparent antenna is integrated in a glass window, which may include a first glass (inner glass) and a second glass (outer glass). The transparent antenna includes a first substrate and a second substrate which are oppositely arranged, and two flexible circuit boards. The first substrate includes a first dielectric substrate 10, two first radiation parts 3, a first feeding structure 61, a second feeding structure 62, a reference electrode layer 5 and two connection components 7. The second substrate includes a second dielectric substrate 20 and two second radiation parts 4. The first dielectric substrate 10 includes a first base 11, a first adhesive layer 12, a first fixing plate 13, a second adhesive layer 14, and a second base 15, which are stacked together. The first feeding structure 61 and the second feeding structure 62 both adopt a T-type power divider. That is, the first feeding structure 61 and the second feeding structure 62 only include one stage of first feeding line. The two connection components 7 are referred to as a first connection component 7 and a second connection component 7, and both are a coplanar waveguide transmission line. That is, each of the two connection components 7 includes a first reference electrode 72, a second reference electrode 73 and a signal electrode 71. The two first radiation parts 3, the first feeding structure 61, the second feeding structure 62, the first reference electrode 72, the second reference electrode 73, and the signal electrode 71 are all disposed on a side of the second base 15 away from the first fixing plate 13. The reference electrode layer 5 is arranged on a side of the first base 11 away from the first fixing plate 13. The reference electrode layer 5 is located on a side of the first base 11 away from the first fixed plate 13. The first radiation part 3 adopts the above described first radiation part 3 with the contour of the octagon, and the two second feeding ports 602 of the first feeding structure 61 are electrically connected to the second sides S2 of the two first radiation parts 3, respectively. The two second feeding ports 602 of the second feeding structure 62 are electrically connected to the fourth sides S4 of the two second radiation parts 4, respectively. The first feeding port 601 of the first feeding structure 61 is electrically connected to the signal electrode 71 of the first connection component 7, and the first feeding port 601 of the second feeding structure 62 is electrically connected to the signal electrode 71 of the second connection component 7. The first reference electrode 72 and the second reference electrode 73 are electrically connected to the reference electrode layer 5 through vias penetrating through the first base 11, the first adhesive layer 12, the first fixing plate 13, the second adhesive layer 14, and the second base 15. The first reference electrodes 72, the second reference electrodes 73 and the signal electrodes 71 in the first connection component 7 and the second connection component 7 are bonded and connected to the corresponding flexible circuit boards, respectively. The second dielectric substrate 20 includes a third base 21, a third adhesive layer 22 and a second fixing plate. Since the transparent antenna is integrated in the glass window, in this case, the second glass of the glass window may serve as the second fixing plate. The second radiation part 4 is disposed on a side of the third base 21 away from the second glass. The second radiation part 4 may have a structure of the quadrangular contour as described above. The two first radiation parts 3, the first feeding structure 61, the second feeding structure 62, the first reference electrode 72, the second reference electrode 73, the signal electrode 71, the reference electrode layer 5, and the second radiation part 4 all adopt a metal mesh structure. A size of the transparent antenna may be 170 mm×90 mm×18 mm (1.47λc×0.78λc×0.156λc, where λc is a wavelength at a center frequency). The spacing between the two first radiation parts 3 is 80 mm (0.69λc).

Figure 15:
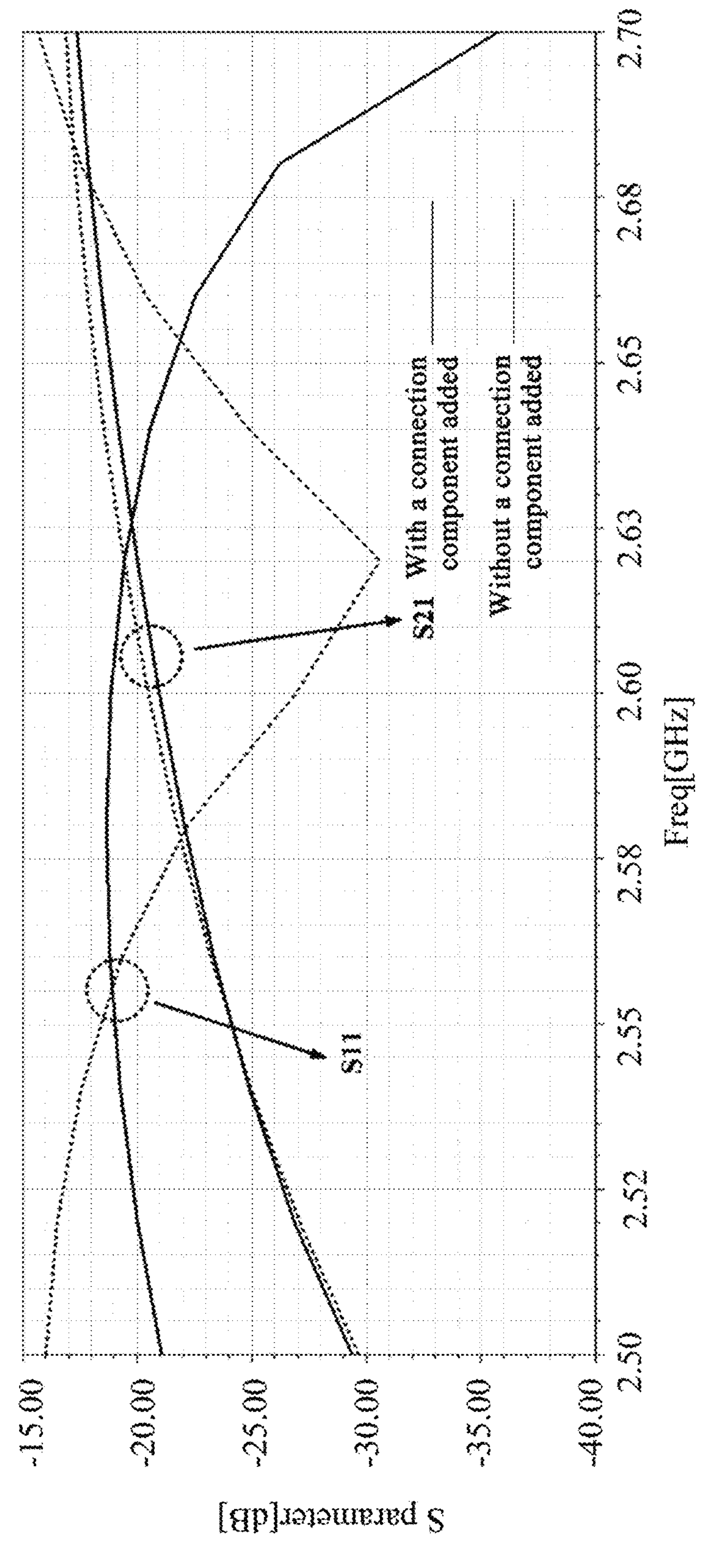
FIG. 15 is a schematic diagram illustrating S parameters before and after a connection component is added to the antenna shown in FIG. 7.

FIG. 15 is a schematic diagram illustrating S parameters before and after a connection component 7 is added to the transparent antenna shown in FIG. 7, which show a return loss and an isolation between ports of the transparent antenna according to an embodiment of the present disclosure, respectively. The transparent antenna according to an embodiment of the present disclosure can cover a frequency band of 2500 MHz to 2700 MHz under the standard that the return loss is less than −15 dB before and after the connection component is added to the transparent antenna, and the return loss is less than −19 dB in the frequency band after the connection component is added to the transparent antenna. Meanwhile, the isolation between ports in the frequency band is greater than −17 dB.

Figure 16:
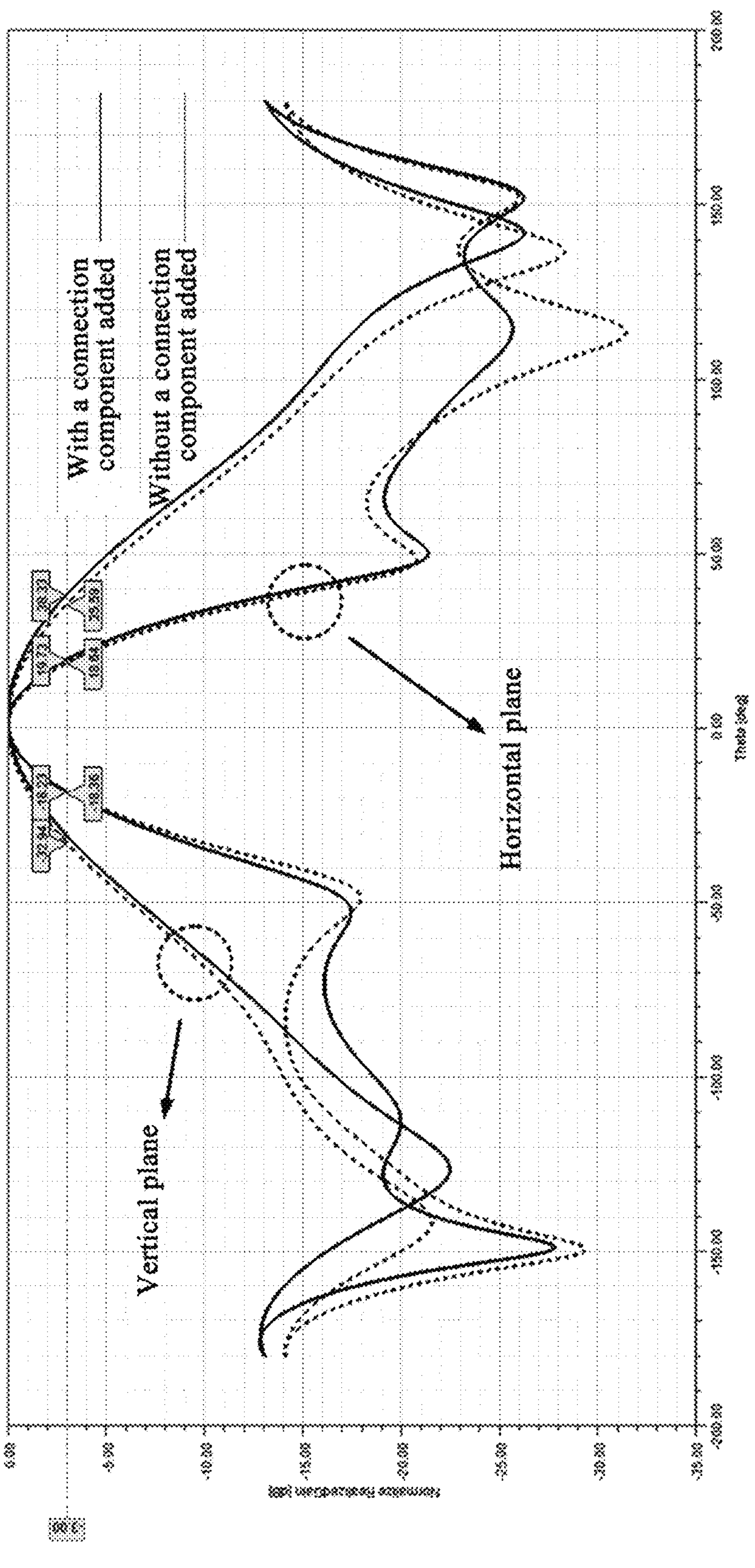
FIG. 16 illustrates radiation patterns at a center frequency before and after a connection component is added to the antenna shown in FIG. 7.

FIG. 16 illustrates radiation patterns at a center frequency before and after a connection component is added to the transparent antenna shown in FIG. 7. As shown in FIG. 16, the 3 dB vertical beam width is 68.5°, and the 3 dB horizontal beam width is 36.9°, before the connection component 7 is added to the transparent antenna. The 3 dB vertical beam width is 69.2°, and the 3 dB horizontal beam width is 38.1°, after the connector component 7 is added to the transparent antenna. It can be seen that the transparent antenna according to the embodiment of the present disclosure has a characteristic of a large angle in the radiation vertical plane, which can effectively cover a wider area, and has a narrower beam width in the horizontal plane, thereby improving the accuracy in the radiation direction. Meanwhile, the beam widths of the transparent antenna in the vertical direction and the horizontal direction each are stable, so that the transparent antenna has a stable communication capability.

Figure 17:
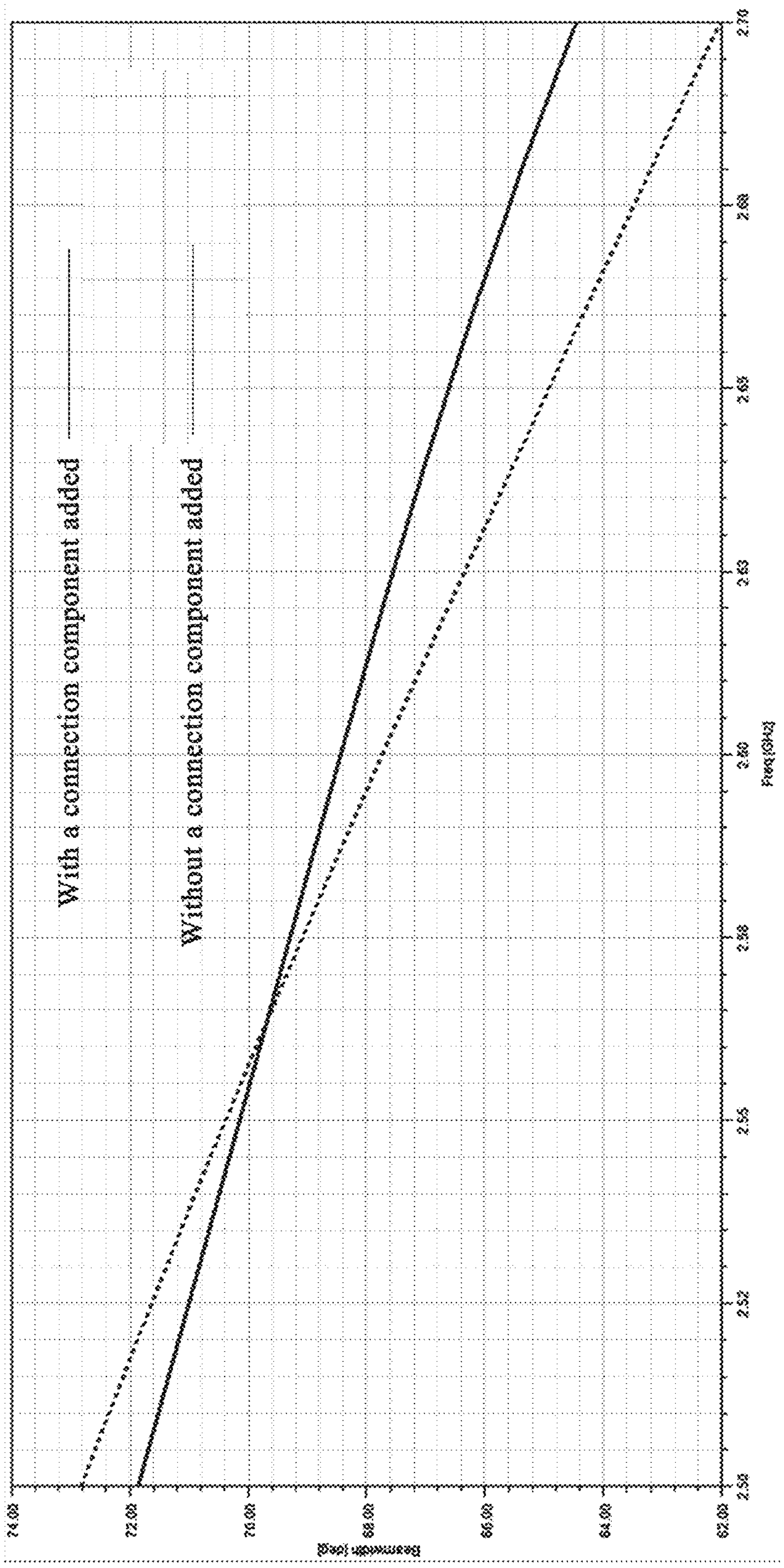
FIG. 17 is a schematic diagram illustrating a vertical plane half-power beam width, which varies with frequency, at a center frequency before and after a connection component is added to the antenna shown in FIG. 7.

FIG. 17 is a schematic diagram illustrating a vertical plane half-power beam width, which varies with frequency, at a center frequency before and after a connection component is added to the transparent antenna shown in FIG. 7. As shown in FIG. 17, the 3 dB vertical beam width is 67.4°±5.4° before the connection element 7 is added to the transparent antenna, and the 3 dB vertical beam width is 68.2°±3.8° after the connector component 7 is added to the transparent antenna.

Figure 18:
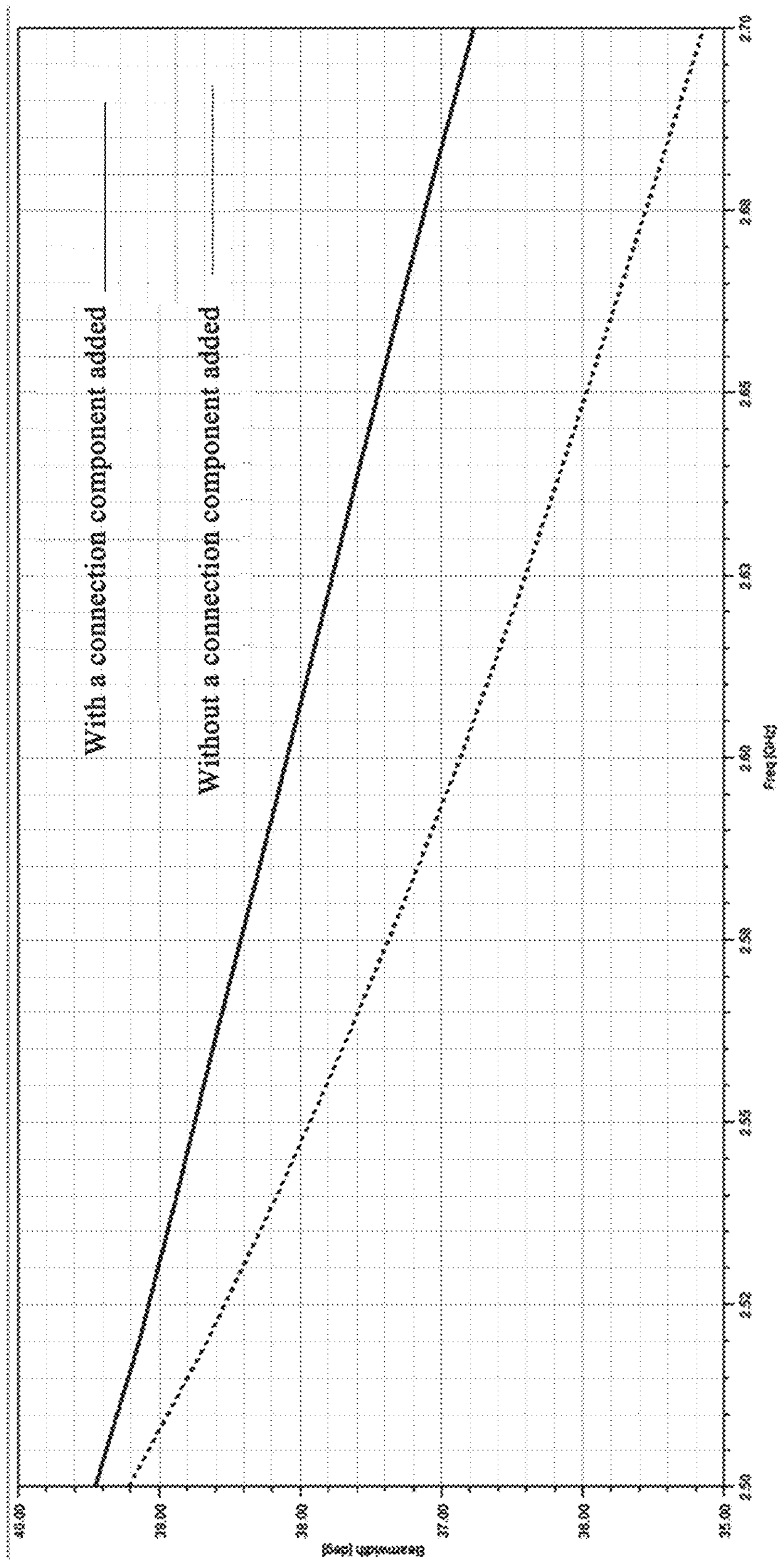
FIG. 18 is a schematic diagram illustrating a horizontal plane half-power beam width, which varies with frequency, at a center frequency before and after a connection component is added to the antenna shown in FIG. 7.

FIG. 18 is a schematic diagram illustrating a horizontal plane half-power beam width, which varies with frequency, at a center frequency before and after a connection component is added to the transparent antenna shown in FIG. 7. As shown in FIG. 18, the 3 dB vertical beam width is 37.1°±2.1° before the connection element 7 is added to the transparent antenna, and the 3 dB vertical beam width is 38.1°±1.3° after the connector component 7 is added to the transparent antenna.

Figure 19:
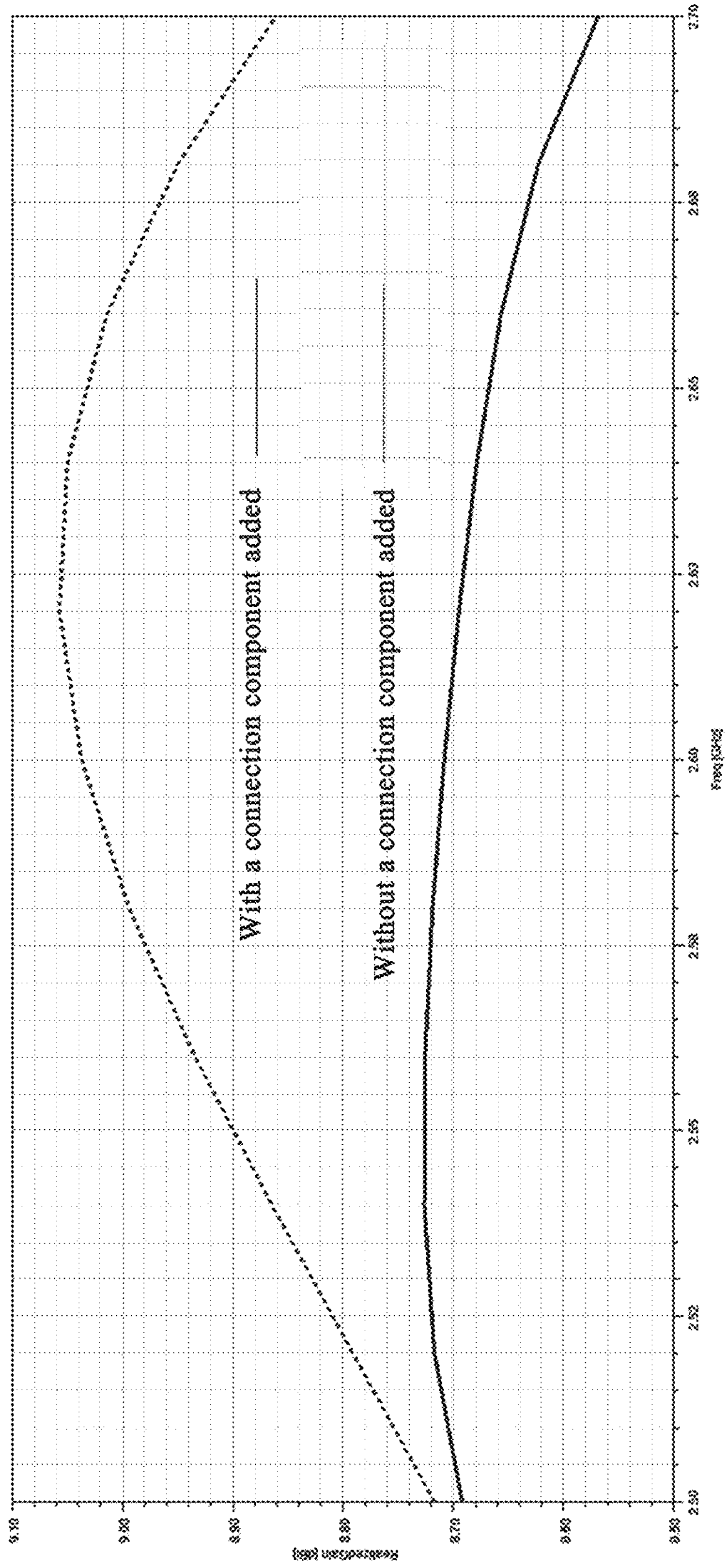
FIG. 19 is a schematic diagram illustrating a peak gain varying with frequency of the antenna shown in FIG. 7.

FIG. 19 is a schematic diagram illustrating a peak gain varying with frequency of the transparent antenna shown in FIG. 7. As shown in FIG. 19, the peak gain of the transparent antenna according to the embodiment of the present disclosure is greater than 8.57 dBi in an operating frequency band of 2500 MHz to 2700 MHZ, which can cover a relatively large communication range.

Figure 20:
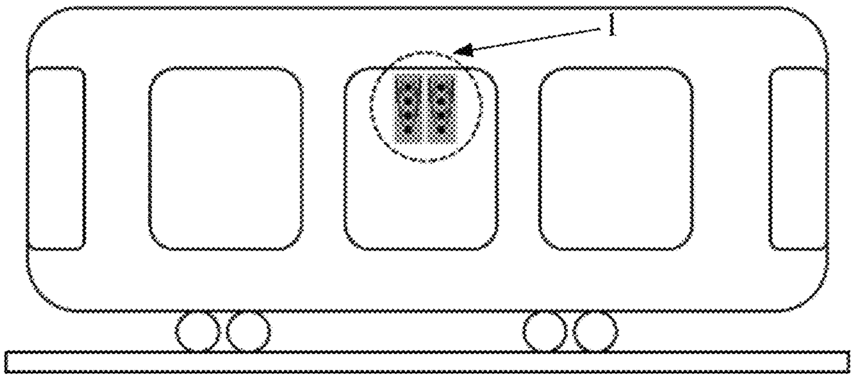
FIG. 20 is a schematic diagram of an antenna system integrated on a glass window according to an embodiment of the present disclosure.

In a second aspect, an embodiment of the present disclosure provides a communication system, which may include the transparent antenna 1 described above. The transparent antenna 1 may be fixed on an inner side of a glass window, as shown in FIG. 20.

The glass window system according to an embodiment of the present disclosure may be used in an automobile, a train (including a high-speed rail train), an aircraft, a building, or the like. The transparent antenna 1 may be fixed on an inner side (a side close to the room) of the glass window. Since the transparent antenna 1 has a high optical transmittance, it has little influence on the transmittance of the glass window while realizing a communication function, and the transparent antenna 1 will also be a trend toward an embellished antenna. The glass window according to an embodiment of the present disclosure includes, but is not limited to, a double-layer glass, and a type of the glass window may alternatively be a single-layer glass, a laminated glass, a thin glass, a thick glass, or the like.

Figure 21:
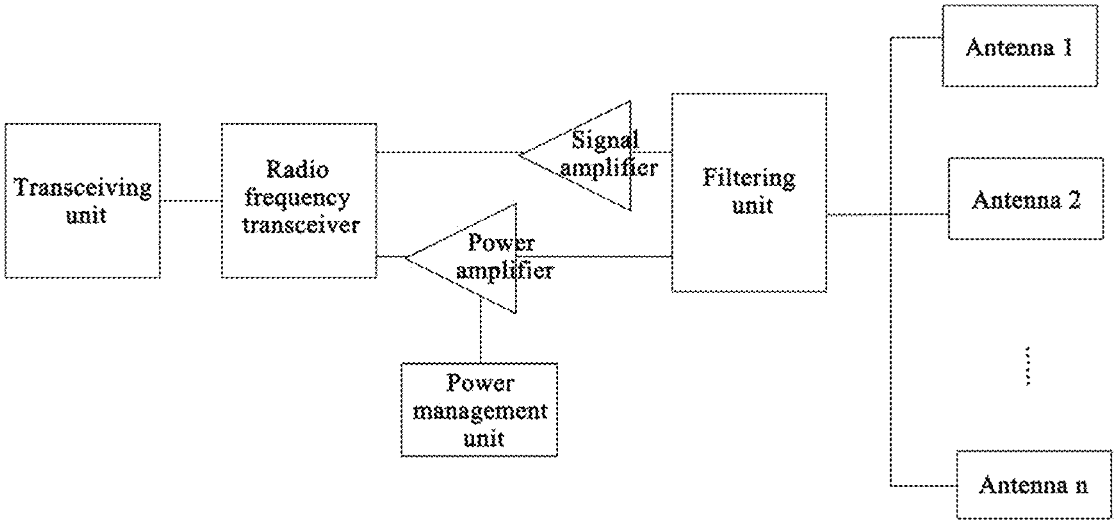
FIG. 21 is a schematic diagram of a communication system according to an embodiment of the present disclosure.

FIG. 21 is a schematic diagram of a communication system according to an embodiment of the present disclosure. In some examples, as shown in FIG. 21, the communication system according to an embodiment of the present disclosure further includes a transceiving unit, a radio frequency transceiver, a signal amplifier, a power amplifier, and a filtering unit. The transparent antenna 1 in the antenna system may be used as a transmitting antenna or as a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the transparent antenna 1 in the antenna system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Further, the radio frequency transceiver is connected to the transceiving unit and is used for modulating the signals transmitted by the transceiving unit or for demodulating the signals received by the transparent antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The transparent antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Further, the radio frequency transceiver is connected to the signal amplifier and the power amplifier, the signal amplifier and the power amplifier are further connected to the filtering unit, and the filtering unit is connected to at least one transparent antenna 1. In the process of transmitting a signal by the antenna system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the transparent antenna, and the transparent antenna 1 radiates the signal. In the process of receiving a signal by the antenna system, the transparent antenna 1 receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the transparent antenna 1. The signal received by the transparent antenna 1 is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the antenna system according to an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

What is claimed is:

1. An antenna, comprising a first substrate and a second substrate which are opposite to each other, wherein the first substrate comprises:

a first dielectric substrate, which has a first surface and a second surface which are opposite to each other;

a reference electrode layer, which is on the first surface;

at least one first radiation part, which is on the second surface, wherein an orthographic projection of the at least one first radiation part on the first dielectric substrate at least partially overlaps an orthographic projection of the reference electrode layer on the first dielectric substrate; and at least one feeding structure, which is on the second surface and electrically connected to the at least one first radiation part, wherein an orthographic projection of the at least one feeding structure on the first dielectric substrate at least partially overlaps with the orthographic projection of the reference electrode layer on the first dielectric substrate, and the second substrate comprises:

a second dielectric substrate, which is opposite to the second surface; and at least one second radiation part, which is on the second dielectric substrate, wherein an orthographic projection of each of the at least one second radiation part on the first surface is within an orthographic projection of a corresponding one of the at least one first radiation part on the first surface.

2. The antenna according to claim 1, further comprising at least one connection component and at least one driving circuit board; each of the at least one feeding structure has one first feeding port and at least one second feeding port; each of the at least one second feeding port of the feeding structure is electrically connected to a corresponding one of the at least one first radiation part; and each of the at least one connection component is electrically connected to the first feeding port, and is bonded and connected to a corresponding one of the at least one driving circuit board.

3. The antenna according to claim 2, wherein the connection component comprises a first reference electrode, a second reference electrode, and a signal electrode on the second surface; extending directions of the first reference electrode, the second reference electrode and the signal electrode are identical; the signal electrode is between the first reference electrode and the second reference electrode;

and the signal electrode is electrically connected to the first feeding port.

4. The antenna according to claim 3, wherein the first reference electrode and the second reference electrode are electrically connected to the reference electrode layer through vias penetrating through the first dielectric substrate, respectively.

5. The antenna according to claim 1, wherein the at least one feeding structure comprises a first feeding structure and a second feeding structure, each of which comprises one first feeding port and at least one second feeding port;

each of the at least one second feeding port of the first feeding structure is connected to a corresponding one of the at least one first radiation part at a node which is a first node; each of the at least one second feeding port of the second feeding structure is connected to a corresponding one of the at least one first radiation par at a node which is a second node; and for each of the at least one first radiation part, there is an included angle between an extending direction of a connecting line, which is between the first node and a center of the first radiation part, and an extending direction of a connecting line, which is between the second node and the center of the first radiation part.

6. The antenna according to claim 5, wherein for each of the at least one first radiation part, an extending direction of a connecting line between the first node and the center of the first radiation part is perpendicular to an extending direction of a connecting line between the second node and the center of the first radiation part.

7. The antenna according to claim 6, wherein a contour of the first radiation part comprises a polygon, and any internal angle of the polygon is greater than 90°.

8. The antenna according to claim 7, wherein the polygon comprises a first side, a second side, a third side, a fourth side, a fifth side, a sixth side, a seventh side, and an eighth side, which are sequentially connected; an extending direction of the first side is the same as an extending direction of the fifth side, and is perpendicular to an extending direction of the third side; and one of the at least one second feeding port of the first feeding structure and one of the at least one second feeding port of the second feeding structure are connected to the second side and the fourth side, respectively.

9. The antenna according to claim 8, wherein the second radiation part comprises a quadrangle, and the quadrangle comprises a ninth side, a tenth side, an eleventh side, and a twelfth side which are sequentially connected; an intersection node between the ninth side and the tenth side is a first vertex, an intersection node between the tenth side and the eleventh side is a second vertex, and an intersection node between the eleventh side and the twelfth side is a third vertex; and an intersection node between the twelfth side and the ninth side is a fourth vertex;

a distance from an orthographic projection of the first vertex on the first radiation part to the second side is a first distance; a distance from an orthographic projection of the second vertex on the first radiation part to the fourth side is a second distance; a distance from an orthographic projection of the third vertex on the first radiation part to the sixth side is a third distance; and a distance from an orthographic projection of the fourth vertex on the first radiation part to the eighth side is a fourth distance; and the first distance, the second distance, the third distance, and the fourth distance have an equal value.

10. The antenna according to claim 8, wherein the second radiation part comprises a quadrangle, and the quadrangle comprises a ninth side, a tenth side, an eleventh side, and a twelfth side which are sequentially connected; an intersection node between the ninth side and the tenth side is a first vertex, an intersection node between the tenth side and the eleventh side is a second vertex, and an intersection node between the eleventh side and the twelfth side is a third vertex; and an intersection node between the twelfth side and the ninth side is a fourth vertex;

an intersection point between extension lines of the first side and the third side is a first intersection point;

an intersection point between extension lines of the third side and the fifth side is a second intersection point; an intersection point between extension lines of the fifth side and the seventh side is a third intersection point; and an intersection point between extension lines of the seventh side and the ninth side is a fourth intersection point;

a distance between orthographic projections of the first vertex and the first intersection point on the first dielectric substrate is a fifth distance; a distance between orthographic projections of the second vertex and the second intersection point on the first dielectric substrate is a sixth distance; a distance between orthographic projections of the third vertex and the third intersection point on the first dielectric substrate is a seventh distance; and a distance between orthographic projections of the fourth vertex and the fourth intersection point on the first dielectric substrate is an eighth distance; and the fifth distance, the sixth distance, the seventh distance, and the eighth distance have an equal value.

11. The antenna according to claim 8, wherein the second radiation part comprises a quadrangle, and the quadrangle comprises a ninth side, a tenth side, an eleventh side, and a twelfth side which are sequentially connected; extending directions of the ninth side and the first side are parallel to each other; extending directions of the tenth side and the third side are parallel to each other; extending directions of the eleventh side and the fifth side are parallel to each other; and extending directions of the twelfth side and the seventh side are parallel to each other.

12. The antenna according to claim 5, wherein the at least one first radiation part comprises 2n first radiation parts, which are arranged at intervals along a length direction of the antenna; each of the first feeding structure and the second feeding structure comprises n stages of first feeding lines;

where n=1, the first feeding line connects two first radiation parts together;

where n≥2, one first feeding line at a 1st stage is connected to two adjacent first radiation parts, and the first radiation parts connected to different first feeding lines at the 1st stage are different; and one first feeding line at an mth stage is connected to two adjacent first feeding lines at an (m−1)th stage, and the first feeding lines at the (m−1)th stage, which are connected to different first feeding lines at the mth stage, are different; where 2≤m≤n, and both m and n are integers.

13. The antenna according to claim 5, wherein the at least one first radiation part comprises a plurality of first radiation parts, centers of the plurality of first radiation parts are on a straight line, a line segment connecting the centers of the plurality of first radiation parts together is a first line segment, and taking an extension line of the first line segment as an axis of symmetry, the first feeding structure and the second feeding structure are symmetric to each other.

14. The antenna according to claim 1, wherein the second dielectric substrate comprises a third base, a third adhesive layer, and a second fixing plate, which are stacked together; and the second radiation part is on a side of the third base away from the second fixing plate.

15. The antenna according to claim 14, wherein the antenna is configured to be applied in a glass window comprising a first glass and a second glass opposite to each other, and be arranged between the first glass and the second glass, and the second glass also serves as the second fixing plate.

16. The antenna according to claim 1, further comprising a first conductive layer comprising the first radiation part and the feeding structure.

17. The antenna according to claim 16, wherein the first conductive layer is of a planar structure and has a contour adapted to a contour of the first dielectric substrate; the first conductive layer further comprises a first redundant electrode, and the first redundant electrode is disconnected from both the feeding structure and the first radiation part.

18. The antenna according to claim 16, further comprising a second conductive layer on the second dielectric substrate, wherein orthographic projections of a contour of the second conductive layer and a contour of the first conductive layer on the first dielectric substrate completely overlap each other, the second conductive layer comprises the second radiation part and a second redundant electrode, and the second radiation part and the second redundant electrode are disconnected from each other.

19. The antenna according to claim 1, wherein the first radiation part satisfies at least one of the following conditions:

having a central aperture;

having a notch at a side concave towards the center;

each corner being a flat chamfer; and having a salient angle at each corner.

20. A communication system, comprising the antenna according to claim 1, wherein the antenna is fixed to a glass window, and the communication system further comprises a transceiving unit configured to transmit or receive a signal;

a radio frequency transceiver, which is connected to the transceiving unit and configured to modulate the signal transmitted by the transceiving unit or demodulate a signal received by the antenna and then transmit the signal to the transceiving unit;

a signal amplifier, which is connected to the radio frequency transceiver and configured to improve a signal-to-noise ratio of the signal output by the radio frequency transceiver or the signal received by the antenna;

a power amplifier, which is connected to the radio frequency transceiver and configured to amplify a power of the signal output by the radio frequency transceiver or the signal received by the antenna; and a filtering unit, which is connected to the signal amplifier, the power amplifier and the antenna, and configured to filter the received signal and then transmit the filtered signal to the antenna or filter the signal received by the antenna.

* * * * *